United States Patent
Srivastava et al.

(10) Patent No.: US 11,797,373 B2
(45) Date of Patent: Oct. 24, 2023

(54) SYSTEM AND METHOD FOR MANAGING FAULTS IN INTEGRATED CIRCUITS

(71) Applicant: NXP B.V., Eindhoven (NL)

(72) Inventors: Neha Srivastava, New Delhi (IN); Ankur Behl, New Delhi (IN)

(73) Assignee: NXP B.V., Eindhoven (NL)

( * ) Notice: Subject to any disclaimer, the term of this patent is extended or adjusted under 35 U.S.C. 154(b) by 130 days.

(21) Appl. No.: 17/643,958

(22) Filed: Dec. 13, 2021

(65) Prior Publication Data
US 2023/0185656 A1    Jun. 15, 2023

(51) Int. Cl.
*G06F 11/00* (2006.01)
*G06F 11/07* (2006.01)

(52) U.S. Cl.
CPC ...... *G06F 11/0793* (2013.01); *G06F 11/0706* (2013.01); *G06F 11/0751* (2013.01); *G06F 11/0772* (2013.01); *G06F 11/0781* (2013.01)

(58) Field of Classification Search
CPC ............. G06F 11/0703; G06F 11/0706; G06F 11/0751; G06F 11/0766; G06F 11/0772; G06F 11/0775; G06F 11/0781; G06F 11/079; G06F 11/0793
See application file for complete search history.

(56) References Cited

U.S. PATENT DOCUMENTS

| | | | |
|---|---|---|---|
| 6,543,003 B1 | 4/2003 | Floyd et al. | |
| 6,691,250 B1 * | 2/2004 | Chandiramani | G06F 11/079 714/48 |
| 7,430,451 B2 | 9/2008 | Muneta et al. | |
| 7,484,131 B2 | 1/2009 | Fields, Jr. et al. | |
| 7,859,313 B2 | 12/2010 | Chien et al. | |
| 7,926,021 B2 * | 4/2011 | Blome | G06F 30/30 716/136 |
| 8,407,515 B2 | 3/2013 | Heyrman et al. | |
| 9,672,095 B2 | 6/2017 | Robertson et al. | |
| 10,013,581 B2 * | 7/2018 | Hershman | G06F 21/75 |
| 10,473,711 B2 | 11/2019 | Ladurner et al. | |
| 10,643,187 B2 | 5/2020 | Barkat et al. | |

(Continued)

OTHER PUBLICATIONS

Jian et al, "A Loss of Reference Clock Detect Circuit", 2009 IEEE Circuits and Systems International Conference on Testing and Diagnosis, Apr. 28-29, 2009, 4 pages.

(Continued)

*Primary Examiner* — Anthony J Amoroso

(57) ABSTRACT

An integrated circuit includes a functional circuit, a detection circuit, a processing circuit, and a recovery circuit. The detection circuit detects a fault in the functional circuit and generates a fault indication indicative of the detected fault. The processing circuit receives the fault indication and identifies a functional domain identifier (ID) associated with the fault. Based on the fault indication, the processing circuit generates context tag data that is indicative of a type of the fault and an operational state of the functional circuit when the fault is detected therein. Further, the processing circuit assigns a priority level to the fault based on the context tag data and the functional domain ID. The recovery circuit performs, based on the functional domain ID, the context tag data, and the first priority level, a recovery operation to recover the functional circuit from the fault.

20 Claims, 8 Drawing Sheets

(56) References Cited

U.S. PATENT DOCUMENTS

| | | | |
|---|---|---|---|
| 10,664,348 B2 | 5/2020 | Johnson et al. | |
| 10,691,527 B2 | 6/2020 | Ryu et al. | |
| 10,831,578 B2* | 11/2020 | Nautiyal | G06F 13/1663 |
| 2018/0239665 A1* | 8/2018 | Hutton | G06F 11/106 |
| 2023/0036117 A1* | 2/2023 | Krishnani | G06F 11/00 |

OTHER PUBLICATIONS

ProteanTecs, https://www.proteantecs.com/technology, downloaded Dec. 10, 2021, 9 pages.

Synopsys Silicon Lifecycle Management Platform, https://news.synopsys.com/2020-10-12-Synopsys-to-Enable-New-Levels-of-Insight-into-SoC-Designs-and-Systems-with-Industrys-First-Silicon-Lifecycle-Management-Platform, downloaded Dec. 10, 2021, 6 pages.

U.S. Appl. No. 17/003,457, "Method and System for Fault Collection and Reaction in System-On-Chip," filed Aug. 26, 2020.

* cited by examiner

SYSTEM AND METHOD FOR MANAGING FAULTS IN INTEGRATED CIRCUITS

FIELD OF USE

The present disclosure relates generally to electronic circuits, and, more particularly, to a system and a method for managing faults in integrated circuits.

BACKGROUND

An integrated circuit (IC) includes various functional circuits (e.g., math accelerators, digital signal processors, or the like) that perform various operations with each other or with a system memory of the IC. Such operations are critical for the accurate functionality of the IC. However, the functional circuits experience various faults while performing the operations. Such faults may cause an operational failure of the IC.

BRIEF DESCRIPTION OF THE DRAWINGS

The following detailed description of the embodiments of the present disclosure will be better understood when read in conjunction with the appended drawings. The present disclosure is illustrated by way of example, and not limited by the accompanying figures, in which like references indicate similar elements.

DETAILED DESCRIPTION

Figure 1:
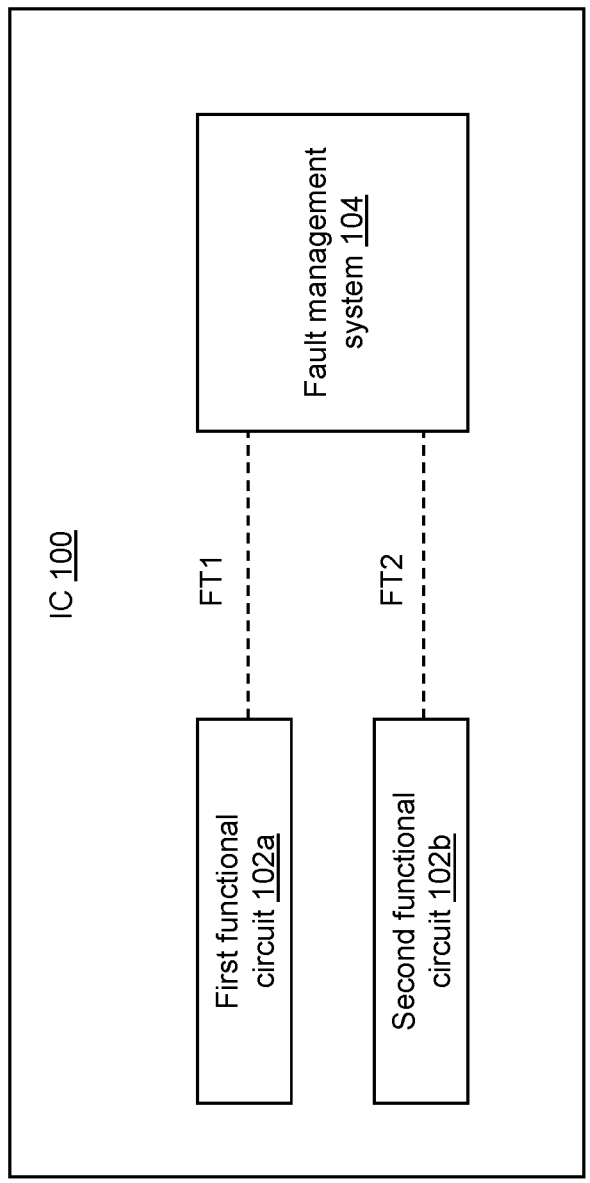
FIG. 1 illustrates a schematic block diagram of an integrated circuit (IC) in accordance with an embodiment of the present disclosure.

The detailed description of the appended drawings is intended as a description of the embodiments of the present disclosure, and is not intended to represent the only form in which the present disclosure may be practiced. It is to be understood that the same or equivalent functions may be accomplished by different embodiments that are intended to be encompassed within the spirit and scope of the present disclosure.

In an embodiment of the present disclosure, an integrated circuit (IC) is disclosed. The IC may include a first functional circuit and a first detection circuit that may be coupled to the first functional circuit. The first detection circuit may be configured to detect a first fault in the first functional circuit and generate a first fault indication that is indicative of the detected first fault. The IC may further include a first processing circuit that may be coupled to the first detection circuit. The first processing circuit may be configured to receive the first fault indication from the first detection circuit. Based on the first fault indication, the first processing circuit may be further configured to identify a first functional domain identifier (ID) associated with the first fault. The first functional domain ID is indicative of the first functional circuit in which the first fault is detected. Further, the first processing circuit may be configured to generate, based on the first fault indication, first context tag data associated with the first fault. The first context tag data is indicative of a type of the first fault and an operational state of the first functional circuit when the first fault is detected in the first functional circuit. The first processing circuit may be further configured to assign a first priority level to the first fault based on the first functional domain ID and the first context tag data. The first functional circuit may be recovered from the first fault based on the first functional domain ID, the first context tag data, and the first priority level.

In another embodiment of the present disclosure, a fault management method is disclosed. The fault management method may include detecting a first fault in a first functional circuit by a first detection circuit. The fault management method may further include generating a first fault indication by the first detection circuit. The first fault indication is indicative of the detected first fault. Further, the fault management method may include receiving the first fault indication from the first detection circuit by a first processing circuit. The fault management method may further include identifying, based on the first fault indication, a first functional domain ID associated with the first fault and generating, based on the first fault indication, first context tag data associated with the first fault by the first processing circuit. The first functional domain ID is indicative of the first functional circuit in which the first fault is detected. The first context tag data is indicative of a type of the first fault and an operational state of the first functional circuit when the first fault is detected in the first functional circuit. The fault management method may further include assigning a first priority level to the first fault by the first processing circuit based on the first context tag data and the first functional domain ID. The first functional circuit may be recovered from the first fault based on the first functional domain ID, the first context tag data, and the first priority level.

In some embodiments, the IC may further include a first storage element. The first storage element may be configured to store a mapping between a plurality of predefined domain IDs, a first predefined context data set, and a first plurality of policies that is associated with the first processing circuit. The first plurality of policies enables determination of a degree of severity of the first fault at the first processing circuit.

In some embodiments, the first processing circuit may be further coupled to the first storage element. The first processing circuit may be further configured to compare the first functional domain ID with each predefined domain ID of the plurality of predefined domain IDs. Similarly, the first processing circuit may be configured to compare the first context tag data with each predefined context data of the first predefined context data set. Further, the first processing circuit may be configured to select, from the first plurality of policies, a first set of policies that is associated with the first functional domain ID and the first context tag data. The first processing circuit selects the first set of policies based on the comparison of the first functional domain ID with each predefined domain ID of the plurality of predefined domain IDs and the comparison of the first context tag data with each predefined context data of the first predefined context data set. The selected first set of policies is indicative of the degree of severity of the first fault as determined at the first processing circuit. The first processing circuit assigns the first priority level to the first fault based on the first set of policies.

In some embodiments, the first functional circuit may be configured to perform a first functional operation. The first fault is detected in the first functional circuit while the first functional operation is being performed by the first functional circuit. The first functional domain ID is further indicative of the first functional operation being performed by the first functional circuit when the first fault is detected in the first functional circuit.

In some embodiments, the IC may further include a set of connection lines that couples the first detection circuit and the first processing circuit. Based on the detected first fault and the first functional operation being performed by the first functional circuit when the first fault is detected therein, the first detection circuit may be further configured to select a connection line from the set of connection lines and provide the first fault indication to the first processing circuit by way of the selected connection line. A connection line ID of the selected connection line represents the first functional domain ID associated with the first fault.

In some embodiments, to generate the first context tag data, the first processing circuit may be further configured to monitor the first functional circuit, and record, when the first fault indication is received, the type of the first fault and the operational state of the first functional circuit.

In some embodiments, the IC may further include a counter that is coupled to the first processing circuit. The counter may be configured to generate a count that is incremented when the first fault indication is received by the first processing circuit. Further, the first processing circuit assigns the first priority level to the first fault based on the count. When the count has a first value, the first priority level assigned to the first fault is greater than that assigned when the count has a second value that is less than the first value.

In some embodiments, the IC may further include a second functional circuit. A second fault is detected in the second functional circuit. The IC may further include a recovery circuit that may be coupled to the first processing circuit. The recovery circuit may be configured to receive the first functional domain ID, the first context tag data, and the first priority level from the first processing circuit. The recovery circuit may further receive a second functional domain ID, second context tag data, and a second priority level associated with the second fault. The second functional domain ID is indicative of the second functional circuit in which the second fault is detected. Further, the second context tag data is indicative of a type of the second fault and an operational state of the second functional circuit when the second fault is detected in the second functional circuit. The second priority level is assigned to the second fault based on the second functional domain ID and the second context tag data. Based on the first functional domain ID and the first context tag data, the recovery circuit may be further configured to generate third context tag data associated with the first fault to facilitate recovery of the first functional circuit from the first fault. Similarly, based on the second functional domain ID and the second context tag data, the recovery circuit may be further configured to generate fourth context tag data associated with the second fault to facilitate recovery of the second functional circuit from the second fault. The third context tag data is indicative of the type of the first fault, the operational state of the first functional circuit when the first fault is detected in the first functional circuit, and a type of the first functional circuit. Further, the fourth context tag data is indicative of the type of the second fault, the operational state of the second functional circuit when the second fault is detected in the second functional circuit, and a type of the second functional circuit.

In some embodiments, the IC may further include a second detection circuit that may be coupled to the second functional circuit. The second detection circuit may be configured to detect the second fault in the second functional circuit and generate a second fault indication that is indicative of the detected second fault. The IC may further include a second processing circuit that may be coupled to the second detection circuit. The second processing circuit may be configured to receive the second fault indication from the second detection circuit and identify, based on the second fault indication, the second functional domain ID associated with the second fault. The second processing circuit may be further configured to generate, based on the second fault indication, the second context tag data associated with the second fault. Based on the second functional domain ID and the second context tag data, the second processing circuit may be further configured to assign the second priority level to the second fault.

In some embodiments, the recovery circuit may be configured to assign a third priority level to the first fault based on the third context tag data, the first functional domain ID, and the first priority level. Similarly, the recovery circuit may be further configured to assign a fourth priority level to the second fault based on the fourth context tag data, the second functional domain ID, and the second priority level. The recovery circuit may be further configured to determine a first recovery operation for the first fault and a second recovery operation for the second fault. The first recovery operation may be determined based on the third context tag data and the first functional domain ID. Similarly, the second recovery operation may be determined based on the fourth context tag data and the second functional domain ID. The recovery circuit may be configured to perform, based on the third priority level and the fourth priority level, the first recovery operation and the second recovery operation to recover the first functional circuit and the second functional circuit from the first fault and the second fault, respectively.

In some embodiments, the third priority level is one of a group consisting of (i) same as the first priority level and (ii) different from the first priority level. Further, the fourth priority level is one of a group consisting of (i) same as the second priority level and (ii) different from the second priority level.

In some embodiments, when the third priority level is greater than the fourth priority level, the first recovery operation is performed before the second recovery operation. Further, when the third priority level is less than the fourth priority level, the second recovery operation is performed before the first recovery operation.

In some embodiments, the IC may further include a second storage element. The second storage element may be configured to store a mapping between a plurality of predefined domain IDs, a second predefined context data set, and a second plurality of policies that is associated with the recovery circuit. The second plurality of policies enables determination of the first recovery operation for the first fault, the second recovery operation for the second fault, a degree of severity of the first fault, and a degree of severity of the second fault at the recovery circuit.

In some embodiments, the recovery circuit may be coupled to the second storage element. The recovery circuit may be further configured to compare the first functional domain ID with each predefined domain ID of the plurality of predefined domain IDs. Similarly, the recovery circuit may be configured to compare the third context tag data with each predefined context data of the second predefined context data set. Further, the recovery circuit may be configured to select, from the second plurality of policies, a second set of policies that is associated with the first functional domain ID and the third context tag data. The recovery circuit selects the second set of policies based on the comparison of the first functional domain ID with each predefined domain ID of the plurality of predefined domain IDs and the comparison of the third context tag data with each predefined context data of the second predefined context data set. The second set of policies is indicative of the first recovery operation for the first fault and the degree of severity of the first fault as determined at the recovery circuit. The recovery circuit assigns the third priority level to the first fault based on the second set of policies and the first priority level.

In some embodiments, the recovery circuit may be coupled to the second storage element. The recovery circuit may be configured to compare the second functional domain ID with each predefined domain ID of the plurality of predefined domain IDs and the fourth context tag data with each predefined context data of the second predefined context data set. Further, the recovery circuit may be configured to select, from the second plurality of policies, a third set of policies that is associated with the second functional domain ID and the fourth context tag data. The recovery circuit selects the third set of policies based on the comparison of the second functional domain ID with each predefined domain ID of the plurality of predefined domain IDs and the comparison of the fourth context tag data with each predefined context data of the second predefined context data set. The third set of policies is indicative of the second recovery operation for the second fault and the degree of severity of the second fault as determined at the recovery circuit. The recovery circuit assigns the fourth priority level to the second fault based on the third set of policies and the second priority level.

In some embodiments, the IC may further include a diagnostic circuit that may be coupled to the first processing circuit and the recovery circuit. The diagnostic circuit may be configured to receive the first context tag data and first status data, and facilitate diagnosis of the first fault after the first functional circuit is recovered from the first fault. The recovery circuit may be further configured to generate the first status data based on the first recovery operation that is performed to recover the first functional circuit from the first fault.

In some embodiments, the IC may further include a diagnostic circuit that may be coupled to the recovery circuit. The diagnostic circuit may be configured to receive the second context tag data and second status data, and facilitate diagnosis of the second fault after the second functional circuit is recovered from the second fault. The recovery circuit may be further configured to generate the second status data based on the second recovery operation that is performed to recover the second functional circuit from the second fault.

To accurately determine a recovery operation for recovering a functional circuit from a fault, information associated with the fault (such as a type of the fault, a type of the functional circuit in which the fault is detected, or the like) is required. Conventionally, upon detecting the fault, fault management systems are required to access a domain associated with the functional circuit to retrieve the requisite information associated with the fault. Such accesses performed for each fault degrade the availability and increase the latency of such fault management systems. Further, as the information associated with the fault is retrieved from a faulty domain, the reliability of the fault management systems degrades.

Various embodiments of the present disclosure disclose an IC including various functional circuits and a fault management system coupled to the functional circuit. The fault management system may include a detection circuit, a processing circuit, and a recovery circuit. The detection circuit may detect a fault in a functional circuit and generate a fault indication that is indicative of the detected fault. The processing circuit may identify, based on the fault indication, a functional domain identifier (ID) associated with the fault. Further, based on the fault indication, the processing circuit may generate context tag data that is indicative of a type of the fault and an operational state of the functional circuit when the fault is detected in the functional circuit. The processing circuit may assign a priority level to the fault based on the functional domain ID and the context tag data. The processing circuit may further generate reporting data associated with the fault. The reporting data may include the context tag data, the assigned priority level, and the functional domain ID.

The recovery circuit may generate another context tag data that is indicative of the type of the fault, a type of the functional circuit, and the operational state of the functional circuit when the fault is detected in the functional circuit. Based on the generated context tag data and the functional domain ID, the recovery circuit may assign another priority level to the fault and determine a recovery operation for the fault. The recovery circuit may similarly assign priority levels to various faults detected in other functional circuits based on the previously assigned priority levels, functional domain IDs of the functional circuits, and context tag data generated by the recovery circuit for such faults. The priority levels assigned by the recovery circuit enable prioritization of the faults based on the degree of severity of the faults. Thus, the recovery circuit may perform, based on the assigned priority level, the determined recovery operation to recover the functional circuit from the fault. Other functional circuits of the IC may be recovered from the fault in a similar manner as described above.

Thus, the fault management system of the present disclosure detects the fault in the functional circuit, determines the recovery operation for the fault, and performs the recovery operation to recover the functional circuit from the fault. As a result, an operational failure of the IC is prevented. In the present disclosure, the recovery circuit determines the recovery operation based on information (e.g., the reporting data) associated with the fault that is received by the recovery circuit. In other words, a need for the recovery circuit to access the faulty domain to retrieve the information associated with the fault is eliminated. Hence, the availability of the fault management system of the present disclosure is greater than that of the conventional fault management systems. Similarly, the latency of the fault management system of the present disclosure is less than that of the conventional fault management systems. Further, as the need to retrieve the information associated with the fault from the faulty domain is eliminated, the reliability of the fault management system of the present disclosure is greater than that of the conventional fault management systems.

FIG. 1 illustrates a schematic block diagram of an integrated circuit (IC) 100 in accordance with an embodiment of the present disclosure. The IC 100 may be a multi-processor IC that may be utilized in various devices such as an automotive device, a networking device, or the like. The IC 100 may include a plurality of functional circuits, of which a first functional circuit 102a and a second functional circuit 102b are shown. Further, the IC 100 may include a fault management system 104.

The first and second functional circuits 102a and 102b may include suitable circuitry that may be configured to perform various functional operations. When the IC 100 is embedded within an automotive device, the functional operations may correspond to an anti-lock braking operation, an airbag control operation, an adaptive cruise control operation, or the like. The first and second functional circuits 102a and 102b may perform separate functional operations concurrently. Alternatively, one functional operation may be performed by both the first and second functional circuits 102a and 102b. Examples of the first and second functional circuits 102a and 102b may include a direct memory access (DMA) controller, a digital signal processor, a math accelerator, a processor core, or the like.

The IC 100 may further include first and second pluralities of resources (not shown) that may be accessed by the first and second functional circuits 102a and 102b for performing the corresponding functional operations, respectively. Examples of the first and second plurality of resources may include one or more hardware schedulers and controllers, one or more clocking circuits, one or more communication peripherals, or the like. The first and second plurality of resources may be coupled to the first and second functional circuits 102a and 102b by way of first and second communication buses (not shown), respectively. Examples of each of the first and second communication buses may include an advanced high-performance bus (AHB), an advanced peripheral bus (APB), an advanced extensible interface (AXI) bus, or the like.

The fault management system 104 may be coupled to the first and second functional circuits 102a and 102b. The fault management system 104 may be configured to detect a first fault FT1 in the first functional circuit 102a. The first fault FT1 may be detected in the first functional circuit 102a while a first functional operation is being performed by the first functional circuit 102a. The first fault FT1 may occur based on a failure of access between the first functional circuit 102a and the first plurality of resources or based on a failure of one or more resources of the first plurality of resources. Similarly, the fault management system 104 may be configured to detect a second fault FT2 in the second functional circuit 102b. The second fault FT2 may be detected in the second functional circuit 102b while a second functional operation is being performed by the second functional circuit 102b. The second fault FT2 may occur based on a failure of access between the second functional circuit 102b and the second plurality of resources or based on a failure of one or more resources of the second plurality of resources. In an example, the first and second faults FT1 and FT2 are detected simultaneously. In another example, the first and second faults FT1 and FT2 are detected sequentially.

The fault management system 104 may be further configured to determine a first recovery operation for the first fault FT1 and a second recovery operation for the second fault FT2. Further, the fault management system 104 may be configured to perform the determined first recovery operation to recover the first functional circuit 102a from the first fault FT1. Examples of the first recovery operation may include a reset of the first functional circuit 102a, a reset of a domain associated with the first functional circuit 102a (e.g., a partition of the IC 100 that includes the first functional circuit 102a), a reset of the IC 100, or the like. Similarly, the fault management system 104 may be configured to perform the determined second recovery operation to recover the second functional circuit 102b from the second fault FT2. Examples of the second recovery operation may include a reset of the second functional circuit 102b, a reset of a domain associated with the second functional circuit 102b (e.g., a partition of the IC 100 that includes the second functional circuit 102b), a reset of the IC 100, or the like.

The order in which the first and second recovery operations are performed is determined based on a degree of severity of the associated faults. For example, when a degree of severity of the first fault FT1 is greater than a degree of severity of the second fault FT2, the first recovery operation is performed before the second recovery operation. Conversely, when the degree of severity of the first fault FT1 is less than the degree of severity of the second fault FT2, the second recovery operation is performed before the first recovery operation. Further, when the degree of severity of the first fault FT1 is same as the degree of severity of the second fault FT2, the order in which the first and second recovery operations are performed may be same as the order in which the first and second faults FT1 and FT2 are detected. Alternatively, when the degree of severity of the first fault FT1 is same as the degree of severity of the second fault FT2, any of the first and second recovery operations may be prioritized.

The fault management system 104 may be further configured to facilitate diagnosis of the first and second faults FT1 and FT2 after the first and second functional circuits 102a and 102b are recovered from the first and second faults FT1 and FT2, respectively. Other functional circuits of the IC 100 may be recovered from corresponding faults by the fault management system 104 in a similar manner as described above. The fault management system 104 is explained in detail in conjunction with FIGS. 2, 3, 4, 5, and 6A-6D.

Figure 2:
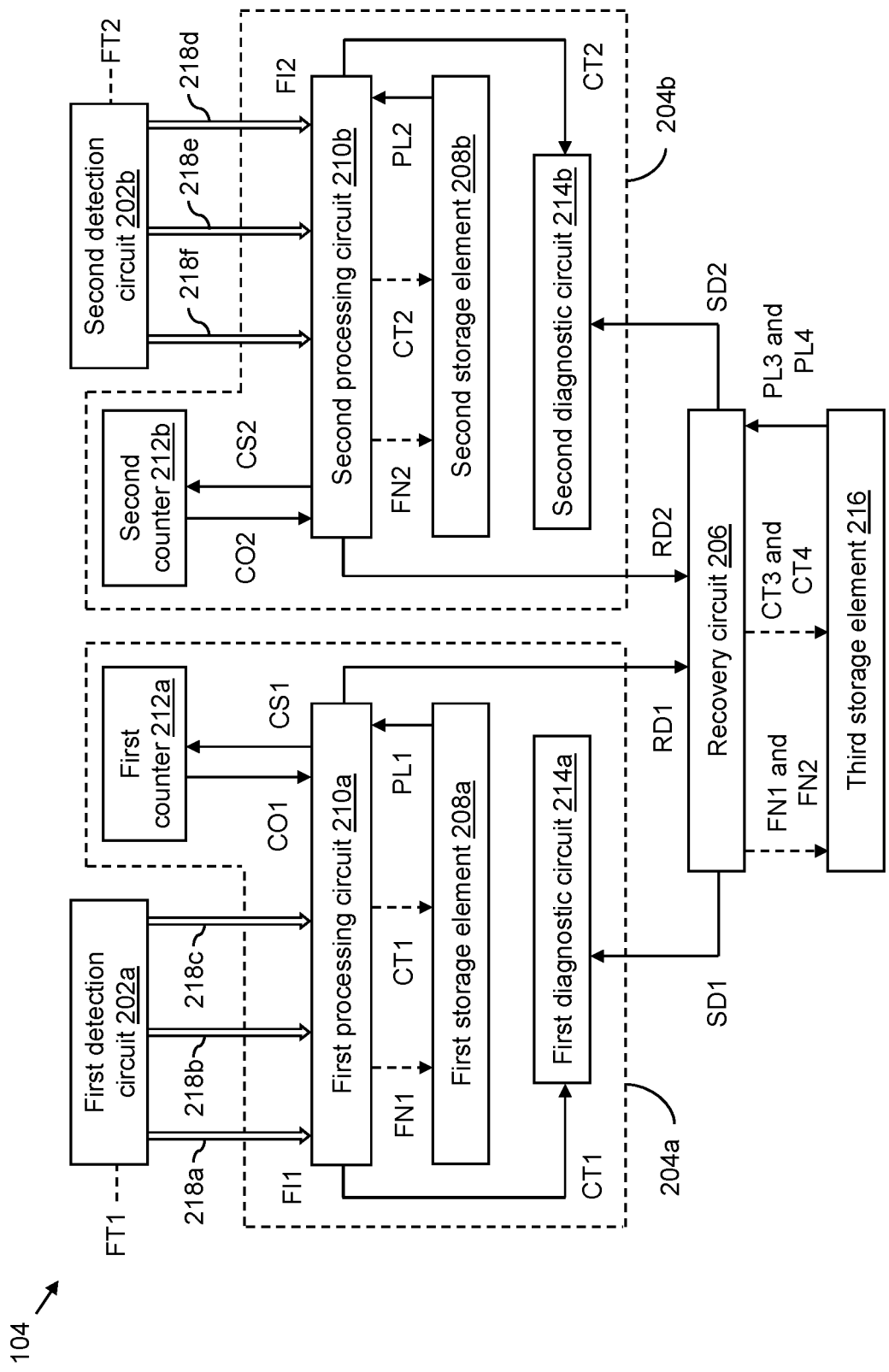
FIG. 2 illustrates a schematic block diagram of a fault management system of the IC of FIG. 1 in accordance with an embodiment of the present disclosure.

FIG. 2 illustrates a schematic block diagram of the fault management system 104 in accordance with an embodiment of the present disclosure. The fault management system 104 may include a plurality of detection circuits of which a first detection circuit 202a and a second detection circuit 202b are shown, and a plurality of reporting circuitries of which first reporting circuitry 204a and second reporting circuitry 204b are shown. The fault management system 104 may further include a recovery circuit 206. The first detection circuit 202a and the first reporting circuitry 204a are associated with (e.g., are included in the fault management system 104 for) the first functional circuit 102a. Similarly, the second detection circuit 202b and the second reporting circuitry 204b are associated with (e.g., are included in the fault management system 104 for) the second functional circuit 102b. The first reporting circuitry 204a may include a first storage element 208a, a first processing circuit 210a, a first counter 212a, and a first diagnostic circuit 214a. Similarly, the second reporting circuitry 204b may include a second storage element 208b, a second processing circuit 210b, a second counter 212b, and a second diagnostic circuit 214b. The fault management system 104 may further include a third storage element 216.

The following table illustrates various signals and data described in FIG. 2:

| Signal/Data | Description |
| --- | --- |
| First and second fault indications FI1 and FI2 | Indicative of the first and second faults FT1 and FT2 detected in the first and second functional circuits 102a and 102b, respectively |
| First functional domain ID FN1 | Indicative of the first functional circuit 102a in which the first fault FT1 is detected and the first functional operation being performed by the first functional circuit 102a when the first fault FT1 is detected therein |
| Second functional domain ID FN2 | Indicative of the second functional circuit 102b in which the second fault FT2 is detected and the second functional operation being performed by the second functional circuit 102b when the second fault FT2 is detected therein |
| First context tag data CT1 | Indicates the type of the first fault FT1 and the operational state of the first functional circuit 102a when the first fault FT1 is detected therein |
| Second context tag data CT2 | Indicates the type of the second fault FT2 and the operational state of the second functional circuit 102b when the second fault FT2 is detected therein |
| First reporting data RD1 | Includes information (such as the type of the first fault FT1, a priority level of the first fault FT1, or the like) required by the recovery circuit 206 to recover the first functional circuit 102a from the first fault FT1 |
| Second reporting data RD2 | Includes information (such as the type of the second fault FT2, a priority level of the second fault FT2, or the like) required by the recovery circuit 206 to recover the second functional circuit 102b from the second fault FT2 |
| First count CO1 | Value generated by the first counter 212a, and is incremented each time a fault indication associated with the first functional circuit 102a is received by the first processing circuit 210a |
| Second count CO2 | Value generated by the second counter 212b, and is incremented each time a fault indication associated with the second functional circuit 102b is received by the second processing circuit 210b |
| First and second count control signals CS1 and CS2 | Utilized for incrementing the first counter 212a and these cond counter 212b, respectively |
| Third context tag data CT3 | Indicates the type of the first fault FT1, the operational state of the first functional circuit 102a when the first fault FT1 is detected therein, and the type of the first functional circuit 102a |
| Fourth context tag data CT4 | Indicates the type of the second fault FT2, the operational state of the second functional circuit 102b when the second fault FT2 is detected therein, and the type of the second functional circuit 102b |

The first detection circuit 202a may be coupled to the first functional circuit 102a and the first reporting circuitry 204a. Similarly, the second detection circuit 202b may be coupled to the second functional circuit 102b and the second reporting circuitry 204b. The first and second detection circuits 202a and 202b may include suitable circuitry that may be configured to perform one or more operations. For example, the first detection circuit 202a may be configured to detect the first fault FT1 in the first functional circuit 102a and generate a first fault indication FI1 that is indicative of the detected first fault FT1. Similarly, the second detection circuit 202b may be configured to detect the second fault FT2 in the second functional circuit 102b and generate a second fault indication FI2 that is indicative of the detected second fault FT2. In an embodiment, the first and second detection circuits 202a and 202b generate the first and second fault indications FI1 and FI2 at a logic high state to indicate that the first and second faults FT1 and FT2 are detected, respectively.

The first and second detection circuits 202a and 202b may be further configured to determine that the first and second faults FT1 and FT2 are detected in the first and second functional circuits 102a and 102b while the first and second functional operations are being performed by the first and second functional circuits 102a and 102b, respectively. Further, the first and second detection circuits 202a and 202b may be configured to provide the first and second fault indications FI1 and FI2 to the first and second reporting circuitries 204a and 204b, respectively.

The fault management system 104 may further include a first set of connection lines, of which a first connection line 218a, a second connection line 218b, and a third connection line 218c are shown, and a second set of connection lines, of which a fourth connection line 218d, a fifth connection line 218e, and a sixth connection line 218f are shown. The first detection circuit 202a may be coupled to the first reporting circuitry 204a (e.g., the first processing circuit 210a) by way of the first set of connection lines. Similarly, the second detection circuit 202b may be coupled to the second reporting circuitry 204b (e.g., the second processing circuit 210b) by way of the second set of connection lines. Each connection line has an associated connection line identifier (ID) that may represent a domain ID associated with a fault (e.g., the first and second faults FT1 and FT2). The domain ID associated with a fault may indicate a functional circuit in which the fault is detected and a functional operation being performed by the functional circuit when the corresponding fault is detected therein.

Thus, based on the first fault FT1, the first functional circuit 102a in which the first fault FT is detected, and the first functional operation being performed by the first functional circuit 102a when the first fault FT1 is detected, the first detection circuit 202a selects a connection line from the first set of connection lines. Similarly, based on the second fault FT2, the second functional circuit 102b in which the second fault FT2 is detected, and the second functional operation being performed by the second functional circuit 102b when the second fault FT2 is detected, the second detection circuit 202b selects a connection line from the second set of connection lines. Further, the first and second detection circuits 202a and 202b may be configured to provide the first and second fault indications FI1 and FI2 to the first and second reporting circuitries 204a and 204b (e.g., the first and second processing circuits 210a and 210b) by way of the corresponding selected connection lines, respectively. It is assumed that the first connection line 218a is selected by the first detection circuit 202a and the fourth connection line 218d is selected by the second detection circuit 202b.

The first reporting circuitry 204a may be coupled to the first detection circuit 202a and the recovery circuit 206. The first reporting circuitry 204a may be configured to receive the first fault indication FI1 from the first detection circuit 202a (e.g., by way of the first connection line 218a). Based on the received first fault indication FI1, the first reporting circuitry 204a may be further configured to identify a first functional domain ID FN1 associated with the first fault FT1. The first reporting circuitry 204a identifies the first functional domain ID FN1 based on the connection line ID of the first connection line 218a by way of which the first fault indication FI1 is received. The first functional domain ID FN1 may be indicative of the first functional circuit 102a in which the first fault FT1 is detected and the first functional operation (e.g., the anti-lock braking operation, the airbag control operation, the adaptive cruise control operation, or the like) performed by the first functional circuit 102a when the first fault FT1 is detected. Further, based on the first fault indication FI1, the first reporting circuitry 204a may be configured to generate first context tag data CT1. The first context tag data CT1 may be indicative of a type of the first fault FT1 (e.g., a parity fault, a timeout fault, or the like) and an operational state (e.g., a booting state, a runtime state, or the like) of the first functional circuit 102a when the first fault FT1 is detected in the first functional circuit 102a.

The first reporting circuitry 204a may be further configured to assign a first priority level to the first fault FT1 based on the first functional domain ID FN1 and the first context tag data CT1. The first priority level is assigned based on a degree of severity of the first fault FT1 as determined at the first reporting circuitry 204a (e.g., at the first processing circuit 210a). Further, the first reporting circuitry 204a may be configured to generate first reporting data RD1 associated with the first fault FT1 and provide the first reporting data RD1 to the recovery circuit 206. The first reporting data RD1 may include the first functional domain ID FN1, the first context tag data CT1, and the first priority level. The first functional circuit 102a may be recovered from the first fault FT1 based on the first reporting data RD1 (e.g., based on the first functional domain ID FN1, the first context tag data CT1, and the first priority level).

The first reporting circuitry 204a may be further configured to receive first status data SD1 from the recovery circuit 206. The first status data SD1 is generated by the recovery circuit 206 based on the recovery of the first functional circuit 102a. Based on the first status data SD1 and the first context tag data CT1, the first reporting circuitry 204a may be further configured to facilitate the diagnosis of the first fault FT1. The diagnosis is performed after the first functional circuit 102a is recovered from the first fault FT1.

Figure 3:
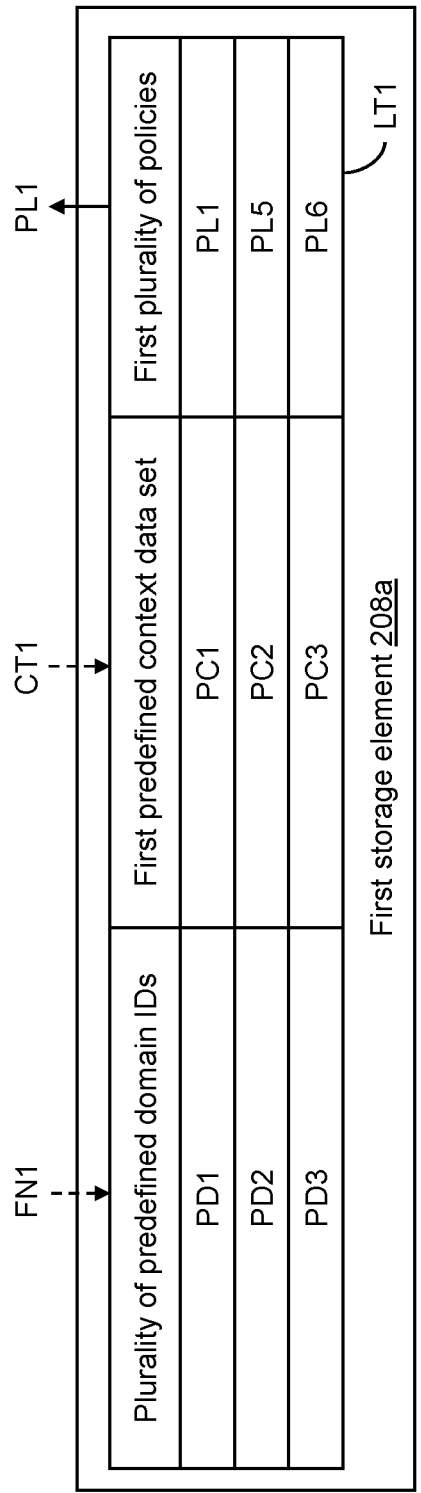
FIG. 3 illustrates a schematic diagram of a first storage element of the fault management system of FIG. 2 in accordance with an embodiment of the present disclosure.

The first storage element 208a may include suitable circuitry that may be configured to perform one or more operations. For example, the first storage element 208a may be configured to store a mapping between a plurality of predefined domain IDs, a first predefined context data set, and a first plurality of policies associated with the first processing circuit 210a. Each context data of the first predefined context data set may be indicative of a fault type and an operational state. Each set of policies of the first plurality of policies may include various predefined rules that may enable the first processing circuit 210a to determine the degree of severity of the first fault FT1. In other words, the first plurality of policies may define various severity levels associated with the first fault FT1. The first storage element 208a is illustrated in FIG. 3.

The first processing circuit 210a may be coupled to the first detection circuit 202a, the first storage element 208a, the first counter 212a, the first diagnostic circuit 214a, and the recovery circuit 206. The first processing circuit 210a may include suitable circuitry that may be configured to perform one or more operations. For example, the first processing circuit 210a may be configured to receive the first fault indication FI1 from the first detection circuit 202a. Further, the first processing circuit 210a may be configured to identify, based on the first fault indication FI1, the first functional domain ID FN1 associated with the first fault FT1. In an embodiment, the first processing circuit 210a may identify the first functional domain ID FN1 based on the connection line ID of the first connection line 218a by way of which the first fault indication FI1 is received from the first detection circuit 202a.

The first processing circuit 210a may be further configured to generate, based on the first fault indication FI1, the first context tag data CT1 that may be indicative of the type of the first fault FT1 and the operational state of the first functional circuit 102a when the first fault FT1 is detected in the first functional circuit 102a. To generate the first context tag data CT1, the first processing circuit 210a may be further configured to monitor the first functional circuit 102a, and record, when the first fault indication FI1 is received, the type of the first fault FT1 and the operational state of the first functional circuit 102a. For example, the first processing circuit 210a records that the detected first fault FT1 is a timeout fault that occurred in the first functional circuit 102a during a booting state of the first functional circuit 102a. The type of the first fault FT1 and the operational state of the first functional circuit 102a when the first fault FT1 is detected in the first functional circuit 102a are thus recorded in real-time. The first processing circuit 210a may be further configured to provide the first context tag data CT1 to the first diagnostic circuit 214a.

The first processing circuit 210a may be further configured to compare, by accessing the first storage element 208a, the first functional domain ID FN1 with each predefined domain ID of the plurality of predefined domain IDs. Similarly, the first processing circuit 210a may be further configured to compare, by accessing the first storage element 208a, the first context tag data CT1 with each predefined context data of the first predefined context data set. Based on the two comparison operations, the first processing circuit 210a may be further configured to select, from the first plurality of policies, one set of policies that is associated with the first functional domain ID FN1 and the first context tag data CT1. In other words, the first processing circuit 210a may be further configured to retrieve one set of policies associated with the first functional domain ID FN1 and the first context tag data CT1 from the first storage element 208a. It is assumed that a first set of policies PL1 of the first plurality of policies is selected (e.g., retrieved) from the first storage element 208a. The first set of policies PL1 is indicative of the degree of severity of the first fault FT1 as determined at the first processing circuit 210a. Based on the selected first set of policies PL1, the first processing circuit 210a may be further configured to assign the first priority level to the first fault FT1. In other words, the first processing circuit 210a may assign the first priority level to the first fault FT1 based on the first context tag data CT1 and the first functional domain ID FN1.

The first processing circuit 210a may be further configured to receive a first count CO1 from the first counter 212a. The first count CO1 may be indicative of a number of times fault indications associated with the first functional circuit 102a are received by the first processing circuit 210a (e.g., a number of faults that are detected in one functional circuit). Thus, the first count CO1 is incremented when the first fault indication FI1 is received. To increment the first counter 212a (e.g., the first count CO1), the first processing circuit 210a may be further configured to generate and provide a first count control signal CS1 to the first counter 212a. In an embodiment, the first counter 212a is incremented when the first count control signal CS1 is at a logic high state.

The first processing circuit 210a may further assign the first priority level to the first fault FT1 based on the first count CO1 of the first counter 212a. In an example, when the first count CO1 has a first value, the first priority level assigned to the first fault FT1 is greater than that assigned when the first count CO1 has a second value that is less than the first value. Thus, if faults are repeatedly detected in the same functional circuit, the priority levels for such faults increase with each detection, thereby ensuring such faults are addressed before other faults.

The first processing circuit 210a may be further configured to generate the first reporting data RD1 associated with the first fault FT1 and provide the first reporting data RD1 to the recovery circuit 206. The first reporting data RD1 may include the first functional domain ID FN1, the first context tag data CT1, and the first priority level. The first reporting data RD1 enables the recovery circuit 206 to respond to the first fault FT1 without having to access the domain associated with the first functional circuit 102a. In other words, the first functional circuit 102a may be recovered from the first fault FT1 based on the first reporting data RD1.

The first counter 212a may be coupled to the first processing circuit 210a. The first counter 212a may include suitable circuitry that may be configured to perform one or more operations. For example, the first counter 212a may be configured to receive the first count control signal CS1 from the first processing circuit 210a. Based on the first count control signal CS1, the first counter 212a may be further configured to generate the first count CO1 such that the first count CO1 is incremented when the first count control signal CS1 is at the logic high state. In other words, the first counter 212a is incremented each time a fault indication (such as the first fault indication FI1) associated with the first functional circuit 102a is received by the first processing circuit 210a. Further, the first counter 212a may be reset when the IC 100 is reset.

The first diagnostic circuit 214a may be coupled to the recovery circuit 206 and the first processing circuit 210a. The first diagnostic circuit 214a may include suitable circuitry that may be configured to perform one or more operations. For example, the first diagnostic circuit 214a may be configured to receive the first status data SD1 from the recovery circuit 206 and the first context tag data CT1 from the first processing circuit 210a. Based on the first context tag data CT1 and the first status data SD1, the first diagnostic circuit 214a may be further configured to facilitate the diagnosis of the first fault FT1 after the first functional circuit 102a is recovered from the first fault FT1. In an embodiment, the first diagnostic circuit 214a corresponds to a memory that stores the first context tag data CT1 and the first status data SD1. The first context tag data CT1 and the first status data SD1 stored in the first diagnostic circuit 214a is retained when the first functional circuit 102a is reset and when the domain associated with the first functional circuit 102a is reset. In such a scenario, the IC 100 may further include a core circuit (not shown) that may access the first diagnostic circuit 214a to retrieve the first context tag data CT1 and the first status data SD1 for the diagnosis of the first fault FT1.

The second reporting circuitry 204b may be coupled to the second detection circuit 202b and the recovery circuit 206. The second reporting circuitry 204b may operate in a manner similar to the first reporting circuitry 204a. For example, the second reporting circuitry 204b may be configured to receive the second fault indication FI2 from the second detection circuit 202b (e.g., by way of the fourth connection line 218d). Based on the received second fault indication FI2, the second reporting circuitry 204b may be further configured to identify a second functional domain ID FN2 associated with the second fault FT2. The second reporting circuitry 204b identifies the second functional domain ID FN2 based on the connection line ID of the fourth connection line 218d by way of which the second fault indication FI2 is received. The second functional domain ID FN2 may be indicative of the second functional circuit 102b in which the second fault FT2 is detected and the second functional operation performed by the second functional circuit 102b when the second fault FT2 is detected. Further, based on the second fault indication FI2, the second reporting circuitry 204b may be configured to generate second context tag data CT2. The second context tag data CT2 may be indicative of a type of the second fault FT2 and an operational state of the second functional circuit 102b when the second fault FT2 is detected in the second functional circuit 102b.

The second reporting circuitry 204b may be further configured to assign a second priority level to the second fault FT2 based on the second functional domain ID FN2 and the second context tag data CT2. The second priority level is assigned based on a degree of severity of the second fault FT2 as determined at the second reporting circuitry 204b (e.g., at the second processing circuit 210b). Further, the second reporting circuitry 204b may be configured to generate second reporting data RD2 associated with the second fault FT2 and provide the second reporting data RD2 to the recovery circuit 206. The second reporting data RD2 may include the second functional domain ID FN2, the second context tag data CT2, and the second priority level. The second functional circuit 102b may be recovered from the second fault FT2 based on the second reporting data RD2.

The second reporting circuitry 204b may be further configured to receive second status data SD2 from the recovery circuit 206. The second status data SD2 is generated by the recovery circuit 206 based on the recovery of the second functional circuit 102b. Based on the second status data SD2 and the second context tag data CT2, the second reporting circuitry 204b may be further configured to facilitate the diagnosis of the second fault FT2. The diagnosis is performed after the second functional circuit 102b is recovered from the second fault FT2.

Figure 4:
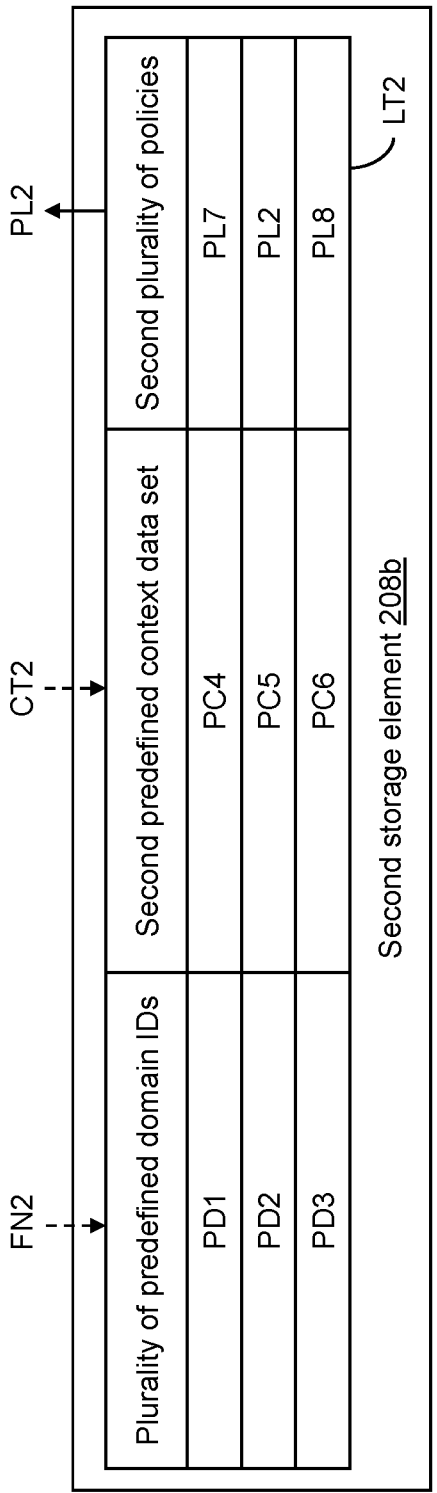
FIG. 4 illustrates a schematic diagram of a second storage element of the fault management system of FIG. 2 in accordance with an embodiment of the present disclosure.

The second storage element 208b may include suitable circuitry that may be configured to perform one or more operations. For example, the second storage element 208b may be configured to store a mapping between the plurality of predefined domain IDs, a second predefined context data set, and a second plurality of policies associated with the second processing circuit 210b. Each context data of the second predefined context data set may be indicative of a fault type and an operational state. Each set of policies of the second plurality of policies may include various predefined rules that may enable the second processing circuit 210b to determine the degree of severity of the second fault FT2. The second storage element 208b is illustrated in FIG. 4.

The second processing circuit 210b may be coupled to the second detection circuit 202b, the second storage element 208b, the second counter 212b, the second diagnostic circuit 214b, and the recovery circuit 206. The second processing circuit 210b may include suitable circuitry that may be configured to perform one or more operations. For example, the second processing circuit 210b may be configured to receive the second fault indication FI2 from the second detection circuit 202b, and identify, based on the second fault indication FI2, the second functional domain ID FN2 associated with the second fault FT2. In an embodiment, the second processing circuit 210b may identify the second functional domain ID FN2 based on the connection line ID of the fourth connection line 218d. The second processing circuit 210b may be further configured to generate, based on the second fault indication FI2, the second context tag data CT2. To generate the second context tag data CT2, the second processing circuit 210b may be further configured to monitor the second functional circuit 102b, and record, when the second fault indication FI2 is received, the type of the second fault FT2 and the operational state of the second functional circuit 102b. The second processing circuit 210b may be further configured to provide the second context tag data CT2 to the second diagnostic circuit 214b.

The second processing circuit 210b may be further configured to compare, by accessing the second storage element 208b, the second functional domain ID FN2 with each predefined domain ID of the plurality of predefined domain IDs. Similarly, the second processing circuit 210b may be further configured to compare, by accessing the second storage element 208b, the second context tag data CT2 with each predefined context data of the second predefined context data set. Based on the two comparison operations, the second processing circuit 210b may be further configured to select, from the second plurality of policies, one set of policies that is associated with the second functional domain ID FN2 and the second context tag data CT2. It is assumed that a second set of policies PL2 of the second plurality of policies is selected (e.g., retrieved) from the second storage element 208b. Based on the selected second set of policies PL2, the second processing circuit 210b may be further configured to assign the second priority level to the second fault FT2. In other words, the second processing circuit 210b may assign the second priority level to the second fault FT2 based on the second context tag data CT2 and the second functional domain ID FN2.

The second processing circuit 210b may be further configured to receive a second count CO2 from the second counter 212b. The second count CO2 may be indicative of a number of times fault indications associated with the second functional circuit 102b are received by the second processing circuit 210b. Thus, the second count CO2 is incremented when the second fault indication FI2 is received. To increment the second counter 212b (e.g., the second count CO2), the second processing circuit 210b may be further configured to generate and provide a second count control signal CS2 to the second counter 212b. Thus, the second processing circuit 210b may further assign the second priority level to the second fault FT2 based on the second count CO2 of the second counter 212b.

The second processing circuit 210b may be further configured to generate the second reporting data RD2 associated with the second fault FT2 and provide the second reporting data RD2 to the recovery circuit 206. The second reporting data RD2 may include the second functional domain ID FN2, the second context tag data CT2, and the second priority level. The second reporting data RD2 enables the recovery circuit 206 to respond to the second fault FT2 without having to access the domain associated with the second functional circuit 102b.

The second counter 212b may be coupled to the second processing circuit 210b. The second counter 212b may include suitable circuitry that may be configured to perform one or more operations. For example, the second counter 212b may be configured to receive the second count control signal CS2 from the second processing circuit 210b. Based on the second count control signal CS2, the second counter 212b may be further configured to generate the second count CO2 such that the second count CO2 is incremented when the second count control signal CS2 is at the logic high state. Further, the second counter 212b may be reset when the IC 100 is reset.

The second diagnostic circuit 214b may be coupled to the recovery circuit 206 and the second processing circuit 210b. The second diagnostic circuit 214b may include suitable circuitry that may be configured to perform one or more operations. For example, the second diagnostic circuit 214b may be configured to receive the second status data SD2 from the recovery circuit 206 and the second context tag data CT2 from the second processing circuit 210b. Based on the second context tag data CT2 and the second status data SD2, the second diagnostic circuit 214b may be further configured to facilitate the diagnosis of the second fault FT2 after the second functional circuit 102b is recovered from the second fault FT2. In an embodiment, the second diagnostic circuit 214b is structurally and functionally same as the first diagnostic circuit 214a.

Figure 5:
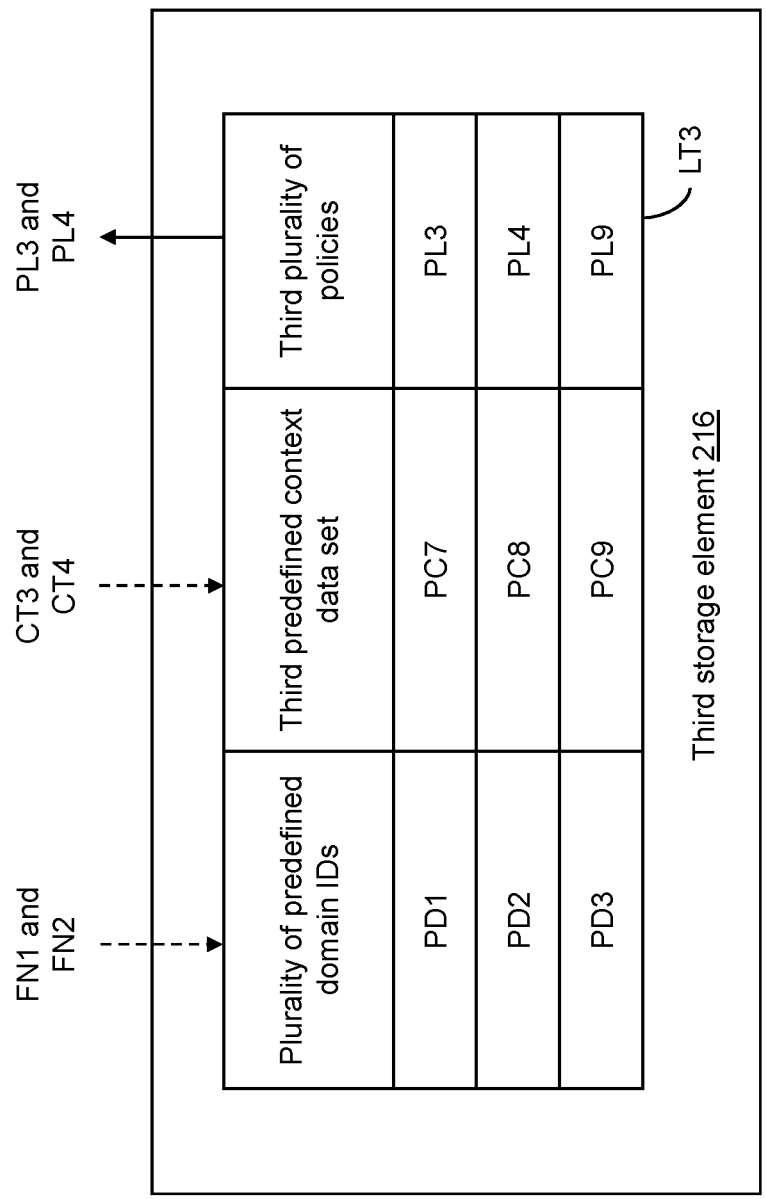
FIG. 5 illustrates a schematic diagram of a third storage element of the fault management system of FIG. 2 in accordance with an embodiment of the present disclosure.

The third storage element 216 may be coupled to the recovery circuit 206. The third storage element 216 may include suitable circuitry that may be configured to perform one or more operations. For example, the third storage element 216 may be configured to store a mapping between the plurality of predefined domain IDs, a third predefined context data set, and a third plurality of policies that is associated with the recovery circuit 206. Each context data of the third predefined context data set may be indicative of a functional circuit type, a fault type, and an operational state. Each set of policies of the third plurality of policies may include various predefined rules that may enable the recovery circuit 206 to determine the degree of severity of the first and second faults FT1 and FT2 and the first and second recovery operations for the first and second faults FT1 and FT2, respectively. The third storage element 216 is illustrated in FIG. 5.

The recovery circuit 206 may be coupled to the first reporting circuitry 204a (e.g., the first processing circuit 210a and the first diagnostic circuit 214a), the second reporting circuitry 204b (e.g., the second processing circuit 210b and the second diagnostic circuit 214b), and the third storage element 216. Further, the recovery circuit 206 may be coupled to the first functional circuit 102a and the second functional circuit 102b. The recovery circuit 206 may include suitable circuitry that may be configured to perform one or more operations. For example, the recovery circuit 206 may be configured to receive the first and second reporting data RD1 and RD2 from the first and second processing circuits 210a and 210b, respectively. In an example, the first and second reporting data RD1 and RD2 are received simultaneously. In another example, the first and second reporting data RD1 and RD2 are received sequentially. When the first reporting data RD1 is received, the recovery circuit 206 may be further configured to determine, based on the first functional domain ID FN1, a type of the first functional circuit 102a. Similarly, when the second reporting data RD2 is received, the recovery circuit 206 may be further configured to determine, based on the second functional domain ID FN2, a type of the second functional circuit 102b.

The recovery circuit 206 may be further configured to generate third context tag data CT3 associated with the first fault FT1 and fourth context tag data CT4 associated with the second fault FT2. The recovery circuit 206 generates the third and fourth context tag data CT3 and CT4 to facilitate recovery of the first and second functional circuits 102a and 102b from the first and second faults FT1 and FT2, respectively. The third context tag data CT3 may be indicative of the type of the first fault FT1, the type of the first functional circuit 102a, and the operational state of the first functional circuit 102a when the first fault FT1 is detected therein. The type of the first fault FT1 and the operational state of the first functional circuit 102a are indicated by the first context tag data CT1, whereas the type of the first functional circuit 102a is determined by the recovery circuit 206 in real-time. The recovery circuit 206 may thus generate the third context tag data CT3 based on the first context tag data CT1 and the first functional domain ID FN1. In an example, the recovery circuit 206 may generate the third context tag data CT3 indicating that a timeout fault occurred in a DMA controller during a booting state of the DMA controller. Similarly, the fourth context tag data CT4 may be indicative of the type of the second fault FT2, the type of the second functional circuit 102b, and the operational state of the second functional circuit 102b when the second fault FT2 is detected therein.

The recovery circuit 206 may be further configured to compare, by accessing the third storage element 216, the first functional domain ID FN1 with each predefined domain ID of the plurality of predefined domain IDs. Similarly, the recovery circuit 206 may be further configured to compare, by accessing the third storage element 216, the third context tag data CT3 with each predefined context data of the third predefined context data set. Based on the two comparison operations, the recovery circuit 206 may be further configured to select, from the third plurality of policies, one set of policies that is associated with the first functional domain ID FN1 and the third context tag data CT3. In other words, the recovery circuit 206 may be configured to retrieve one set of policies associated with the first functional domain ID FN1 and the third context tag data CT3 from the third storage element 216. Similarly, the recovery circuit 206 may be further configured to compare, by accessing the third storage element 216, the second functional domain ID FN2 with each predefined domain ID of the plurality of predefined domain IDs and the fourth context tag data CT4 with each predefined context data of the third predefined context data set. Based on the two comparison operations, the recovery circuit 206 may be further configured to select, from the third plurality of policies, one set of policies that is associated with the second functional domain ID FN2 and the fourth context tag data CT4.

It is assumed that third and fourth sets of policies PL3 and PL4 of the third plurality of policies are selected (i.e., retrieved) from the third storage element 216 for the first and second faults FT1 and FT2, respectively. The recovery circuit 206 selects the third set of policies PL3 for the first fault FT1 based on the comparison of the first functional domain ID FN1 with each predefined domain ID of the plurality of predefined domain IDs and the comparison of the third context tag data CT3 with each predefined context data of the third predefined context data set. The selected third set of policies PL3 is indicative of the degree of severity of the first fault FT1 as determined at the recovery circuit 206 and the first recovery operation for the first fault FT1. Similarly, the recovery circuit 206 selects the fourth set of policies PL4 for the second fault FT2 based on the comparison of the second functional domain ID FN2 with each predefined domain ID of the plurality of predefined domain IDs and the comparison of the fourth context tag data CT4 with each predefined context data of the third predefined context data set. The selected fourth set of policies PL4 is indicative of the degree of severity of the second fault FT2 as determined at the recovery circuit 206 and the second recovery operation for the second fault FT2.

The recovery circuit 206 may be further configured to assign a third priority level to the first fault FT1 based on the selected third set of policies PL3 and the first priority level. In other words, the recovery circuit 206 may assign the third priority level to the first fault FT1 based on the third context tag data CT3, the first functional domain ID FN1, and the first priority level. The third priority level may be same as the first priority level or may be different from the first priority level. As the third priority level is assigned based on additional information (e.g., the type of the first functional circuit 102a), the third priority level is more refined (i.e., more accurate) than the first priority level. For example, if the first functional circuit 102a is a critical component of the IC 100, the third priority level is greater than the first priority level. The recovery circuit 206 may be further configured to determine, based on the selected third set of policies PL3 (e.g., one or more predefined rules included therein), the first recovery operation associated with the first fault FT1. The recovery circuit 206 thus determines the first recovery operation based on the third context tag data CT3 and the first functional domain ID FN1.

The recovery circuit 206 may be further configured to assign a fourth priority level to the second fault FT2 based on the selected fourth set of policies PL4 and the second priority level. In other words, the recovery circuit 206 may assign the fourth priority level to the second fault FT2 based on the fourth context tag data CT4, the second functional domain ID FN2, and the second priority level. The fourth priority level may be same as the second priority level or may be different from the second priority level. As the fourth priority level is assigned based on additional information (e.g., the type of the second functional circuit 102b), the fourth priority level is more refined (i.e., more accurate) than the second priority level. For example, if the second functional circuit 102b is a critical component of the IC 100, the fourth priority level is greater than the second priority level. The recovery circuit 206 may be further configured to determine, based on the selected fourth set of policies PL4 (e.g., one or more predefined rules included therein), the second recovery operation associated with the second fault FT2. The recovery circuit 206 thus determines the second recovery operation based on the fourth context tag data CT4 and the second functional domain ID FN2.

The recovery circuit 206 may be configured to perform, based on the third and fourth priority levels, the first and second recovery operations to recover the first and second functional circuits 102a and 102b from the first and second faults FT1 and FT2, respectively. When the third priority level is greater than the fourth priority level, the first recovery operation is performed before the second recovery operation. Conversely, when the third priority level is less than the fourth priority level, the second recovery operation is performed before the first recovery operation. When the third and fourth priority levels are same, the order in which the first and second recovery operations are performed may be same as the order in which the first and second reporting data RD1 and RD2 are received by the recovery circuit 206. In such a scenario, if the first and second reporting data RD1 and RD2 are received simultaneously, any of the first and second recovery operations may be prioritized. Further, if one of the first and second recovery operations corresponds to the reset of the IC 100, the other recovery operation is not performed. Various faults detected in other functional circuits of the IC 100 may be managed in a similar manner as described above The priority levels assigned by the recovery circuit 206 enable the prioritization of faults based on the degree of severity of the faults. For example, if two faults are assigned equal priority levels by associated processing circuits, the recovery circuit 206 assigns a higher priority level to one of the two faults based on the types of functional circuits in which the faults are detected. For example, if one fault is detected in a processor core associated with an operating system and the other fault is detected in a math accelerator, the fault detected in the processor core is assigned a higher priority level than the fault detected in the math accelerator.

In such a scenario, the recovery operation for the fault detected in the processor core is to be performed before performing the recovery operation for the fault detected in the math accelerator.

The recovery circuit 206 may be further configured to generate the first and second status data SD1 and SD2 based on the first and second recovery operations that are performed to recover the first and second functional circuits 102a and 102b from the first and second faults FT1 and FT2, respectively. Further, the recovery circuit 206 may be configured to provide the first and second status data SD1 and SD2 to the first and second diagnostic circuits 214a and 214b, respectively. The recovery circuit 206 may be further configured to provide the first and second status data SD1 and SD2 and the first and second context tag data CT1 and CT2 to a controller (not shown) that is external to the IC 100 for facilitating the diagnosis of the first and second faults FT1 and FT2, respectively.

Variations in the Fault Management System 104 of FIG. 2:

In a first variation, the first and second processing circuits 210a and 210b may determine and perform the first and second recovery operations based on the first and second reporting data RD1 and RD2 to recover the first and second functional circuits 102a and 102b, respectively, instead of the recovery circuit 206 performing the first and second recovery operations. In such a scenario, the predefined rules included in each set of policies of the first and second pluralities of policies may further enable the first and second processing circuits 210a and 210b to determine the first and second recovery operations for the first and second faults FT1 and FT2, respectively.

In a second variation, if the recovery circuit 206 fails to recover the first and second functional circuits 102a and 102b from the first and second faults FT1 and FT2, the recovery circuit 206 may generate and provide a trigger signal (not shown) to the controller that is external to the IC 100. In such a scenario, the controller may reset the IC 100.

In a third variation, the first and second counters 212a and 212b may be reset or decremented in a different manner (e.g., when the first and second functional circuits 102a and 102b are reset, when the domains associated with the first and second functional circuits 102a and 102b are reset, or the like) instead of being reset when the IC 100 is reset.

In a fourth variation, the first detection circuit 202a and the first reporting circuitry 204a may be coupled to multiple functional circuits instead of a single functional circuit (e.g., the first functional circuit 102a). In such a scenario, the first reporting circuitry 204a may include one counter for each functional circuit, and each such counter may operate in a manner similar to the first counter 212a. Similarly, the second detection circuit 202b and the second reporting circuitry 204b may be coupled to multiple functional circuits instead of a single functional circuit (e.g., the second functional circuit 102b). In such a scenario, the second reporting circuitry 204b may include one counter for each functional circuit, and each such counter may operate in a manner similar to the second counter 212b.

In a fifth variation, the first and second reporting circuitries 204a and 204b may share a common diagnostic circuit, instead of the first and second reporting circuitries 204a and 204b having dedicated diagnostic circuits.

FIG. 3 illustrates a schematic diagram of the first storage element 208a in accordance with an embodiment of the present disclosure. The first storage element 208a may be configured to store the mapping between the plurality of predefined domain IDs, the first predefined context data set, and the first plurality of policies associated with the first processing circuit 210a. The plurality of predefined domain IDs may include first through third predefined domain IDs PD1-PD3, and the first predefined context data set may include first through third predefined context data PC1-PC3. Similarly, the first plurality of policies may include the first set of policies PL1 and fifth and sixth sets of policies PL5 and PL6. The core circuit may be configured to generate and store the mapping between the plurality of predefined domain IDs, the first predefined context data set, and the first plurality of policies in the first storage element 208a. The mapping may be stored during a boot operation of the IC 100.

The mapping between the plurality of predefined domain IDs, the first predefined context data set, and the first plurality of policies may be stored in the first storage element 208a in the form of a first look-up table (LUT) LT1. As illustrated by a first row of the first LUT LT1, the first predefined domain ID PD1 and the first predefined context data PC1 are mapped to the first set of policies PL1. Similarly, as illustrated by a second row of the first LUT LT1, the second predefined domain ID PD2 and the second predefined context data PC2 are mapped to the fifth set of policies PL5. Further, as illustrated by a third row of the first LUT LT1, the third predefined domain ID PD3 and the third predefined context data PC3 are mapped to the sixth set of policies PL6.

The first processing circuit 210a compares the first functional domain ID FN1 with each predefined domain ID of the plurality of predefined domain IDs and the first context tag data CT1 with each predefined context data of the first predefined context data set. When the first functional domain ID FN1 and the first context tag data CT1 matches one predefined domain ID and one predefined context data, respectively, the associated set of policies from the first plurality of policies is selected (e.g., retrieved) from the first storage element 208a. Thus, the first set of policies PL1 is selected when the first functional domain ID FN1 matches the first predefined domain ID PD1 and the first context tag data CT1 matches the first predefined context data PC1.

The scope of the present disclosure is not limited to the first LUT LT1 including the mapping between three predefined domain IDs, three predefined context data, and three sets of policies. In various other embodiments, a count of the predefined domain IDs, a count of the context data, and a count of the sets of policies may be less than or more than three, without deviating from the scope of the present disclosure.

FIG. 4 illustrates a schematic diagram of the second storage element 208b in accordance with an embodiment of the present disclosure. The second storage element 208b may be configured to store the mapping between the plurality of predefined domain IDs, the second predefined context data set, and the second plurality of policies associated with the second processing circuit 210b. The plurality of predefined domain IDs may include the first through third predefined domain IDs PD1-PD3, and the second predefined context data set may include fourth through sixth predefined context data PC4-PC6. Similarly, the second plurality of policies may include the second set of policies PL2 and seventh and eighth sets of policies PL7 and PL8.

The mapping between the plurality of predefined domain IDs, the second predefined context data set, and the second plurality of policies may be stored in the second storage element 208b in the form of a second LUT LT2. As illustrated by a first row of the second LUT LT2, the first predefined domain ID PD1 and the fourth predefined context data PC4 are mapped to the seventh set of policies PL7.

Similarly, as illustrated by a second row of the second LUT LT2, the second predefined domain ID PD2 and the fifth predefined context data PC5 are mapped to the second set of policies PL2. Further, as illustrated by a third row of the second LUT LT2, the third predefined domain ID PD3 and the sixth predefined context data PC6 are mapped to the eighth set of policies PL8. The core circuit may be configured to generate and store the mapping between the plurality of predefined domain IDs, the second predefined context data set, and the second plurality of policies in the second storage element 208b during the boot operation of the IC 100.

The second processing circuit 210b compares the second functional domain ID FN2 with each predefined domain ID of the plurality of predefined domain IDs and the second context tag data CT2 with each predefined context data of the second predefined context data set. When the second functional domain ID FN2 and the second context tag data CT2 matches one predefined domain ID and one predefined context data, respectively, the associated set of policies from the second plurality of policies is selected (e.g., retrieved) from the second storage element 208b. Thus, the second set of policies PL2 is selected when the second functional domain ID FN2 matches the second predefined domain ID PD2 and the second context tag data CT2 matches the fifth predefined context data PC5.

The scope of the present disclosure is not limited to the second LUT LT2 including the mapping between three predefined domain IDs, three predefined context data, and three sets of policies. In various other embodiments, a count of the predefined domain IDs, a count of the predefined context data, and a count of the sets of policies may be less than or more than three, without deviating from the scope of the present disclosure.

FIG. 5 illustrates a schematic diagram of the third storage element 216 in accordance with an embodiment of the present disclosure. The third storage element 216 may be configured to store the mapping between the plurality of predefined domain IDs, the third predefined context data set, and the third plurality of policies that is associated with the recovery circuit 206. The plurality of predefined domain IDs may include the first through third predefined domain IDs PD1-PD3. The third predefined context data set may include seventh through ninth predefined context data PC7-PC9. Further, the third plurality of policies may include the third and fourth sets of policies PL3 and PL4 and a ninth set of policies PL9.

The mapping between the plurality of predefined domain IDs, the third predefined context data set, and the third plurality of policies may be stored in the third storage element 216 in the form of a third LUT LT3. As illustrated by a first row of the third LUT LT3, the first predefined domain ID PD1 and the seventh predefined context data PC7 are mapped to the third set of policies PL3. Similarly, as illustrated by a second row of the third LUT LT3, the second predefined domain ID PD2 and the eighth predefined context data PC8 are mapped to the fourth set of policies PL4. Further, as illustrated by a third row of the third LUT LT3, the third predefined domain ID PD3 and the ninth predefined context data PC9 are mapped to the ninth set of policies PL9. The core circuit may be configured to generate and store the mapping between the plurality of predefined domain IDs, the third predefined context data set, and the third plurality of policies in the third storage element 216. The mapping may be stored during the boot operation of the IC 100.

The recovery circuit 206 compares the first and second functional domain IDs FN1 and FN2 with each predefined domain ID of the plurality of predefined domain IDs and the third and fourth context tag data CT3 and CT4 with each predefined context data of the third predefined context data set. When the first functional domain ID FN1 and the third context tag data CT3 matches one predefined domain ID and one predefined context data, respectively, the associated set of policies from the third plurality of policies is selected (e.g., retrieved) from the third storage element 216. Thus, the third set of policies PL3 is selected when the first functional domain ID FN1 matches the first predefined domain ID PD1 and the third context tag data CT3 matches the seventh predefined context data PC7. Similarly, the fourth set of policies PL4 is selected when the second functional domain ID FN2 matches the second predefined domain ID PD2 and the fourth context tag data CT4 matches the eighth predefined context data PC8.

The scope of the present disclosure is not limited to the third LUT LT3 including the mapping between three predefined domain IDs, three predefined context data, and three sets of policies. In various other embodiments, a count of the predefined domain IDs, a count of the predefined context data, and a count of the sets of policies may be less than or more than three, without deviating from the scope of the present disclosure.

Figure 6A:
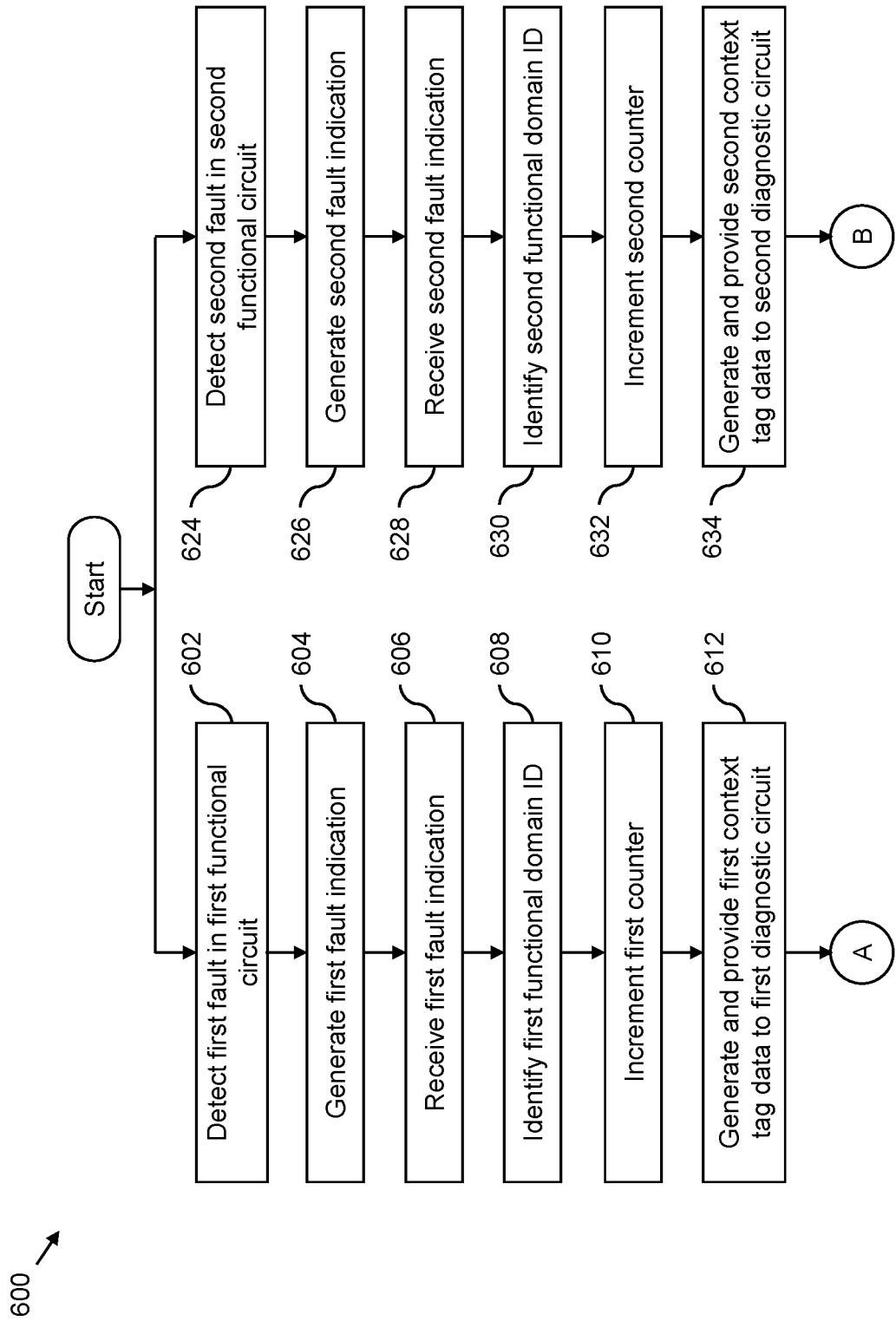
FIGS. 6A-6D, collectively, represents a flowchart that illustrates a fault management method in accordance with an embodiment of the present disclosure.

FIGS. 6A-6D, collectively, represents a flowchart 600 that illustrates a fault management method in accordance with an embodiment of the present disclosure. The fault management method corresponds to managing faults (such as the first and second faults FT1 and FT2) in the IC 100. The fault management method may be implemented by the fault management system 104. Referring now to FIG. 6A, at step 602, the first detection circuit 202a may detect the first fault FT1 in the first functional circuit 102a. The first detection circuit 202a may detect the first fault FT1 while the first functional operation is being performed by the first functional circuit 102a. At step 604, the first detection circuit 202a may generate the first fault indication FI1 that is indicative of the detected first fault FT1.

At step 606, the first processing circuit 210a may receive the first fault indication FI1 from the first detection circuit 202a. At step 608, the first processing circuit 210a may identify the first functional domain ID FN1 associated with the first fault FT1 based on the first fault indication FI1. The first functional domain ID FN1 may be indicative of the first functional circuit 102a in which the first fault FT1 is detected and the first functional operation being performed by the first functional circuit 102a when the first fault FT1 is detected therein. At step 610, the first processing circuit 210a may increment the first counter 212a (e.g., the first count CO1). The first processing circuit 210a may increment the first counter 212a based on the first count control signal CS1. At step 612, the first processing circuit 210a may generate the first context tag data CT1 based on the first fault indication FI1 and provide the first context tag data CT1 to the first diagnostic circuit 214a. The first context tag data CT1 may be indicative of the type of the first fault FT1 and the operational state of the first functional circuit 102a when the first fault FT1 is detected therein.

Figure 6B:
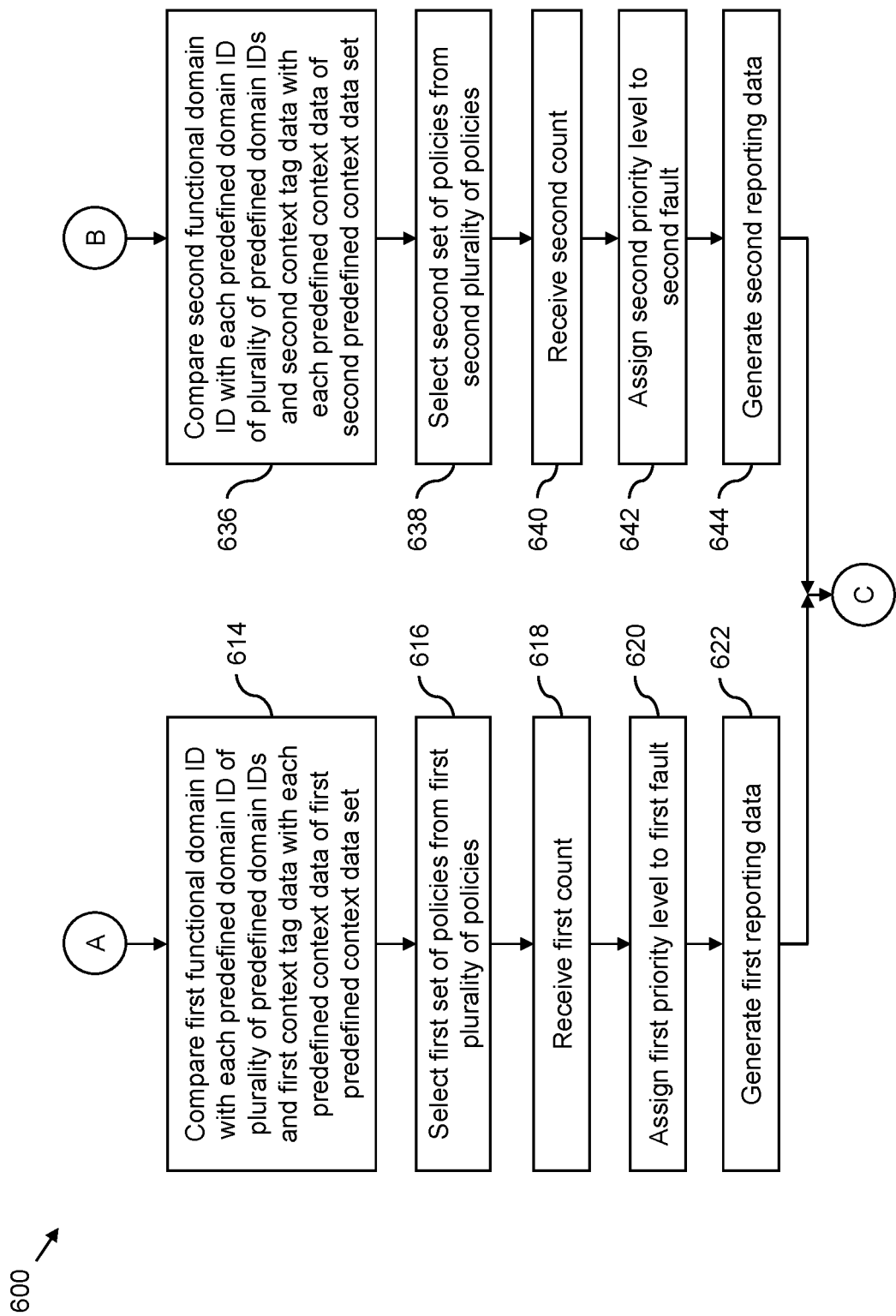

Referring now to FIG. 6B, at step 614, the first processing circuit 210a may compare the first functional domain ID FN1 with each predefined domain ID of the plurality of predefined domain IDs and the first context tag data CT1 with each predefined context data of the first predefined context data set. At step 616, the first processing circuit 210a may select, from the first plurality of policies, the first set of policies PL1 associated with the first functional domain ID FN1 and the first context tag data CT1. At step 618, the first processing circuit 210a may receive the first count CO1 from the first counter 212a.

At step 620, the first processing circuit 210a may assign the first priority level to the first fault FT1. The first processing circuit 210a may assign the first priority level based on the first set of policies PL1 and the first count CO1. At step 622, the first processing circuit 210a may generate the first reporting data RD1. The first reporting data RD1 may include the first functional domain ID FN1, the first context tag data CT1, and the first priority level.

Referring back to FIG. 6A, at step 624, the second detection circuit 202b may detect the second fault FT2 in the second functional circuit 102b. The second detection circuit 202b detects the second fault FT2 while the second functional operation is being performed by the second functional circuit 102b. At step 626, the second detection circuit 202b may generate the second fault indication FI2 that is indicative of the detected second fault FT2.

At step 628, the second processing circuit 210b may receive the second fault indication FI2 from the second detection circuit 202b. At step 630, the second processing circuit 210b may identify the second functional domain ID FN2 associated with the second fault FT2 based on the second fault indication FI2. The second functional domain ID FN2 may be indicative of the second functional circuit 102b in which the second fault FT2 is detected and the second functional operation being performed by the second functional circuit 102b when the second fault FT2 is detected therein. At step 632, the second processing circuit 210b may increment the second counter 212b (e.g., the second count CO2). The second processing circuit 210b may increment the second counter 212b based on the second count control signal CS2. At step 634, the second processing circuit 210b may generate the second context tag data CT2 based on the second fault indication FI2 and provide the second context tag data CT2 to the second diagnostic circuit 214b. The second context tag data CT2 may be indicative of the type of the second fault FT2 and the operational state of the second functional circuit 102b when the second fault FT2 is detected therein.

Referring back to FIG. 6B, at step 636, the second processing circuit 210b may compare the second functional domain ID FN2 with each predefined domain ID of the plurality of predefined domain IDs and the second context tag data CT2 with each predefined context data of the second predefined context data set. At step 638, the second processing circuit 210b may select, from the second plurality of policies, the second set of policies PL2 associated with the second functional domain ID FN2 and the second context tag data CT2. At step 640, the second processing circuit 210b may receive the second count CO2 from the second counter 212b.

At step 642, the second processing circuit 210b may assign the second priority level to the second fault FT2. The second processing circuit 210b may assign the second priority level based on the second set of policies PL2 and the second count CO2. At step 644, the second processing circuit 210b may generate the second reporting data RD2. The second reporting data RD2 may include the second functional domain ID FN2, the second context tag data CT2, and the second priority level. As illustrated in FIGS. 6A and 6B, steps 602-622 and 624-644 are performed simultaneously by the first and second processing circuits 210a and 210b, respectively.

Figure 6C:
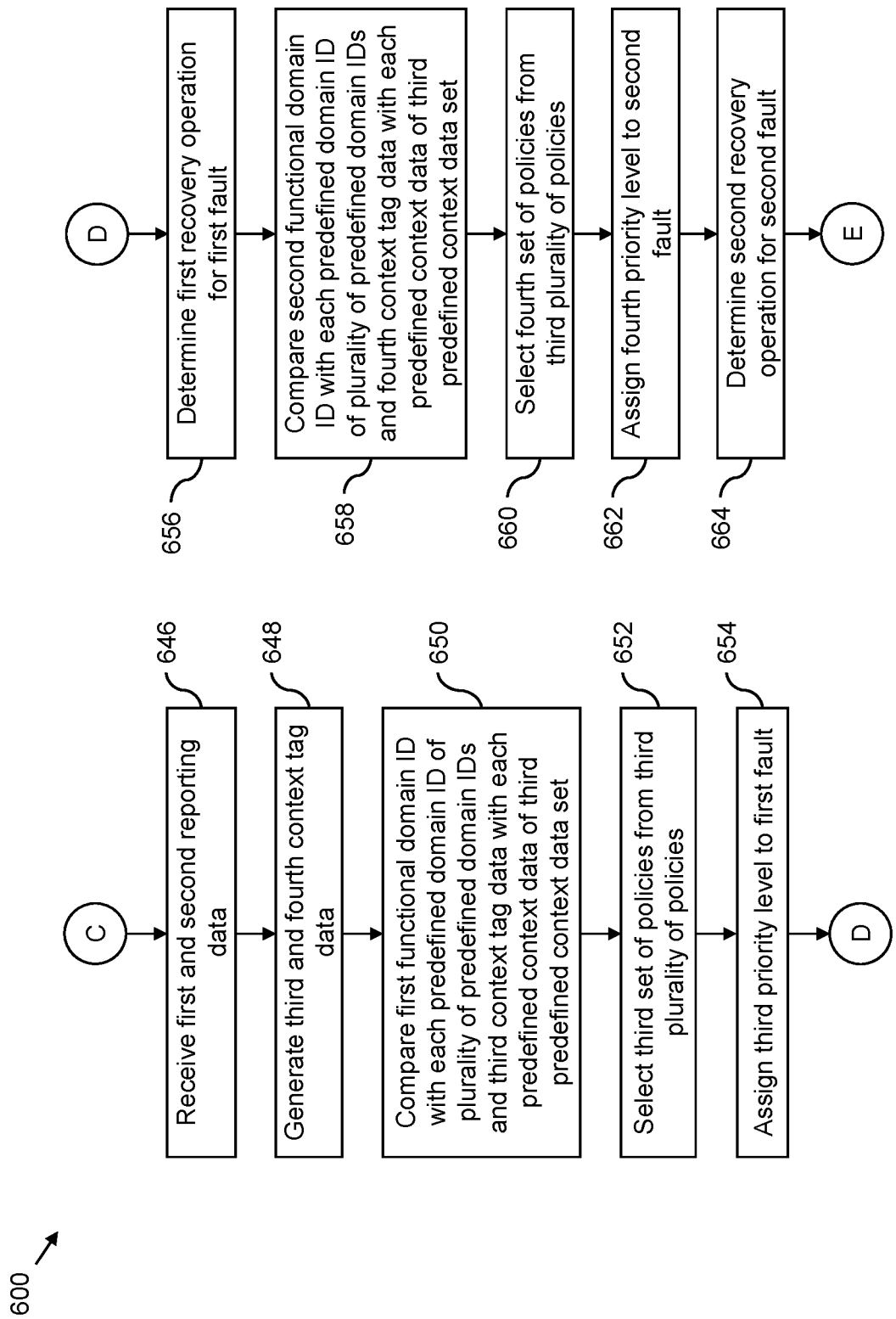

Referring now to FIG. 6C, at step 646, the recovery circuit 206 may receive the first and second reporting data RD1 and RD2 from the first and second processing circuits 210a and 210b, respectively. At step 648, the recovery circuit 206 may generate the third context tag data CT3 associated with the first fault FT1 and fourth context tag data CT4 associated with the second fault FT2. The recovery circuit 206 may generate the third context tag data CT3 based on the first functional domain ID FN1 and the first context tag data CT1. Similarly, the recovery circuit 206 may generate the fourth context tag data CT4 based on the second functional domain ID FN2 and the second context tag data CT2.

At step 650, the recovery circuit 206 may compare the first functional domain ID FN1 with each predefined domain ID of the plurality of predefined domain IDs and the third context tag data CT3 with each predefined context data of the third predefined context data set. At step 652, the recovery circuit 206 may select, from the third plurality of policies, the third set of policies PL3 associated with the first functional domain ID FN1 and the third context tag data CT3. At step 654, the recovery circuit 206 may assign, based on the third set of policies PL3 and the first priority level, the third priority level to the first fault FT1. At step 656, the recovery circuit 206 may determine, based on the third set of policies PL3, the first recovery operation associated with the first fault FT1.

At step 658, the recovery circuit 206 may compare the second functional domain ID FN2 with each predefined domain ID of the plurality of predefined domain IDs and the fourth context tag data CT4 with each predefined context data of the third predefined context data set. At step 660, the recovery circuit 206 may select, from the third plurality of policies, the fourth set of policies PL4 associated with the second functional domain ID FN2 and the fourth context tag data CT4. At step 662, the recovery circuit 206 may assign, based on the fourth set of policies PL4 and the second priority level, the fourth priority level to the second fault FT2. At step 664, the recovery circuit 206 may determine, based on the fourth set of policies PL4, the second recovery operation for the second fault FT2.

Figure 6D:
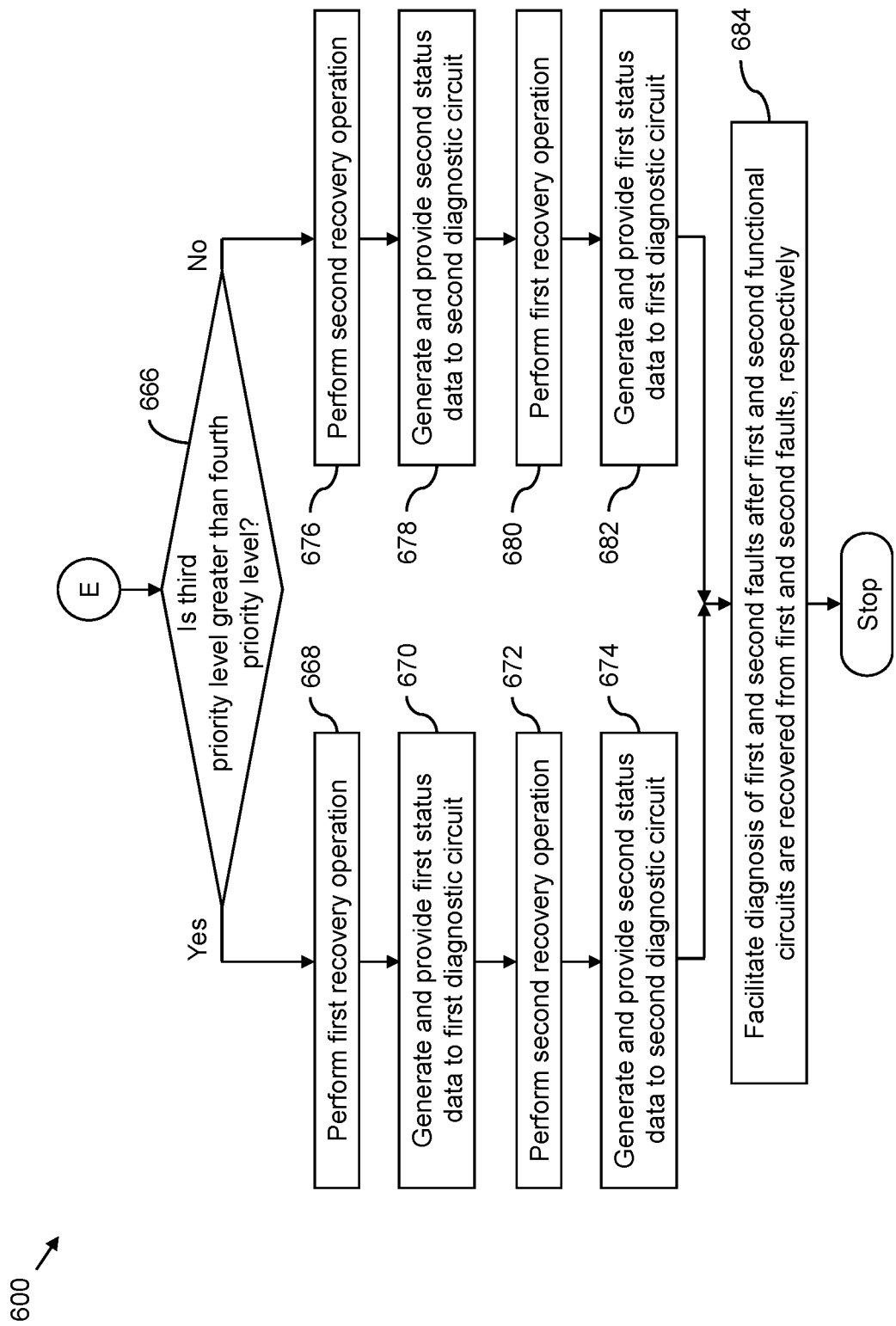

Referring now to FIG. 6D, at step 666, the recovery circuit 206 may determine whether the third priority level is greater than the fourth priority level. If at step 666, the recovery circuit 206 determines that the third priority level is greater than the fourth priority level, step 668 is performed. At step 668, the recovery circuit 206 may perform the first recovery operation to recover the first functional circuit 102a from the first fault FT1. At step 670, the recovery circuit 206 may generate the first status data SD1 based on the first recovery operation that is performed to recover the first functional circuit 102a from the first fault FT1 and provide the first status data SD1 to the first diagnostic circuit 214a. At step 672, the recovery circuit 206 may perform the second recovery operation to recover the second functional circuit 102b from the second fault FT2. At step 674, the recovery circuit 206 may generate the second status data SD2 based on the second recovery operation that is performed to recover the second functional circuit 102b from the second fault FT2 and provide the second status data SD2 to the second diagnostic circuit 214b. Step 684 is performed after step 674.

If at step 666, the recovery circuit 206 determines that the third priority level is less than or equal to the fourth priority level, step 676 is performed. At step 676, the recovery circuit 206 may perform the second recovery operation to recover the second functional circuit 102b from the second fault FT2. At step 678, the recovery circuit 206 may generate the second status data SD2 based on the second recovery operation that is performed to recover the second functional circuit 102*b* from the second fault FT2 and provide the second status data SD2 to the second diagnostic circuit 214*b*. At step 680, the recovery circuit 206 may perform the first recovery operation to recover the first functional circuit 102*a* from the first fault FT1. At step 682, the recovery circuit 206 may generate the first status data SD1 based on the first recovery operation that is performed to recover the first functional circuit 102*a* from the first fault FT1 and provide the first status data SD1 to the first diagnostic circuit 214*a*.

At step 684, the first and second diagnostic circuits 214*a* and 214*b* may facilitate the diagnosis of the first and second faults FT1 and FT2 after the first and second functional circuits 102*a* and 102*b* are recovered from the first and second faults FT1 and FT2, respectively. The first diagnostic circuit 214*a* may facilitate the diagnosis of the first fault FT1 based on the first status data SD1 and the first context tag data CT1. Similarly, the second diagnostic circuit 214*b* may facilitate the diagnosis of the second fault FT2 based on the second status data SD2 and the second context tag data CT2.

Although the flowchart 600 describes that the first and second faults FT1 and FT2 are detected simultaneously, the scope of the present disclosure is not limited to it. In an alternate embodiment, the first and second faults FT1 and FT2 may be detected sequentially, without deviating from the scope of the present disclosure. In such a scenario, while the second detection circuit 202*b* and the second reporting circuitry 204*b* are detecting the second fault FT2 and generating the second reporting data RD2, respectively, the recovery circuit 206 may determine the first recovery operation.

The fault management system 104 of the present disclosure thus detects a fault (e.g., the first fault FT1) in a functional circuit (e.g., the first functional circuit 102*a*), determines a recovery operation (e.g., the first recovery operation) for the fault, and performs the recovery operation to recover the functional circuit from the fault. As a result, an operational failure of the IC 100 is avoided.

To accurately determine the recovery operations to be performed, various information associated with the faults (such as types of the faults, types of the functional circuits, or the like) is required. Conventionally, the fault management systems are required to access domains associated with the functional circuits to retrieve the requisite information from multiple registers. Such accesses performed for each fault degrade the availability and increase the latency of the conventional fault management systems. Further, as the information is retrieved from faulty domains, the reliability of the conventional fault management systems also degrades.

In the present disclosure, the recovery circuit 206 determines the recovery operation based on information associated with the fault (e.g., the first functional domain ID FN1, the type of the first fault FT1, and the operational state of the first functional circuit 102*a* when the first fault FT1 is detected therein) that is received by the recovery circuit 206. In other words, a need to retrieve the information associated with the fault from a faulty domain is eliminated. Hence, the availability of the fault management system 104 is greater than that of conventional fault management systems. Similarly, the latency of the fault management system 104 is less than that of the conventional fault management systems. The elimination of the need to retrieve the information associated with the fault from a faulty domain further results in the reliability of the fault management system 104 being greater than that of the conventional fault management systems.

While various embodiments of the present disclosure have been illustrated and described, it will be clear that the present disclosure is not limited to these embodiments only. Numerous modifications, changes, variations, substitutions, and equivalents will be apparent to those skilled in the art, without departing from the spirit and scope of the present disclosure, as described in the claims. Further, unless stated otherwise, terms such as "first" and "second" are used to arbitrarily distinguish between the elements such terms describe. Thus, these terms are not necessarily intended to indicate temporal or other prioritization of such elements.

The invention claimed is:

1. An integrated circuit (IC), comprising:
   a first functional circuit;
   a first detection circuit that is coupled to the first functional circuit, and configured to detect a first fault in the first functional circuit and generate a first fault indication that is indicative of the detected first fault; and
   a first processing circuit that is coupled to the first detection circuit, and configured to:
      receive the first fault indication from the first detection circuit;
      identify, based on the first fault indication, a first functional domain identifier (ID) associated with the first fault, wherein the first functional domain ID is indicative of the first functional circuit in which the first fault is detected;
      generate, based on the first fault indication, first context tag data associated with the first fault, wherein the first context tag data is indicative of a type of the first fault and an operational state of the first functional circuit when the first fault is detected in the first functional circuit; and
      assign a first priority level to the first fault based on the first functional domain ID and the first context tag data, wherein the first functional circuit is recovered from the first fault based on the first functional domain ID, the first context tag data, and the first priority level.

2. The IC of claim 1, further comprising a first storage element configured to store a mapping between a plurality of predefined domain IDs, a first predefined context data set, and a first plurality of policies that is associated with the first processing circuit, wherein the first plurality of policies enables determination of a degree of severity of the first fault at the first processing circuit.

3. The IC of claim 2, wherein the first processing circuit is further coupled to the first storage element, and configured to:
   compare the first functional domain ID with each predefined domain ID of the plurality of predefined domain IDs and the first context tag data with each predefined context data of the first predefined context data set; and
   select, from the first plurality of policies, a first set of policies that is associated with the first functional domain ID and the first context tag data, wherein the first processing circuit selects the first set of policies based on the comparison of the first functional domain ID with each predefined domain ID of the plurality of predefined domain IDs and the comparison of the first context tag data with each predefined context data of the first predefined context data set, wherein the first set of policies is indicative of the degree of severity of the first fault as determined at the first processing circuit, and wherein the first processing circuit assigns the first priority level to the first fault based on the first set of policies.

4. The IC of claim 1, wherein the first functional circuit is configured to perform a first functional operation, wherein the first fault is detected in the first functional circuit while the first functional operation is being performed by the first functional circuit, and wherein the first functional domain ID is further indicative of the first functional operation being performed by the first functional circuit when the first fault is detected in the first functional circuit.

5. The IC of claim 4, further comprising a set of connection lines that couples the first detection circuit and the first processing circuit, wherein based on the detected first fault, the first functional circuit in which the first fault is detected, and the first functional operation being performed by the first functional circuit when the first fault is detected therein, the first detection circuit is further configured to select a connection line from the set of connection lines and provide the first fault indication to the first processing circuit by way of the selected connection line, and wherein a connection line ID of the selected connection line represents the first functional domain ID associated with the first fault.

6. The IC of claim 1, wherein to generate the first context tag data, the first processing circuit is further configured to monitor the first functional circuit, and record, when the first fault indication is received, the type of the first fault and the operational state of the first functional circuit.

7. The IC of claim 1, further comprising a counter that is coupled to the first processing circuit, and configured to generate a count that is incremented when the first fault indication is received by the first processing circuit, wherein the first processing circuit further assigns the first priority level to the first fault based on the count, and wherein when the count has a first value, the first priority level assigned to the first fault is greater than that assigned when the count has a second value that is less than the first value.

8. The IC of claim 1, further comprising:
a second functional circuit, wherein a second fault is detected in the second functional circuit; and
a recovery circuit that is coupled to the first processing circuit, and configured to:
receive the first functional domain ID, the first context tag data, and the first priority level from the first processing circuit;
receive a second functional domain ID, second context tag data, and a second priority level associated with the second fault, wherein the second functional domain ID is indicative of the second functional circuit in which the second fault is detected, wherein the second context tag data is indicative of a type of the second fault and an operational state of the second functional circuit when the second fault is detected in the second functional circuit, and wherein the second priority level is assigned to the second fault based on the second functional domain ID and the second context tag data; and
generate third context tag data and fourth context tag data associated with the first fault and the second fault to facilitate recovery of the first functional circuit and the second functional circuit from the first fault and the second fault, respectively, wherein the third context tag data is generated based on the first functional domain ID and the first context tag data, and the fourth context tag data is generated based on the second functional domain ID and the second context tag data, wherein the third context tag data is indicative of the type of the first fault, the operational state of the first functional circuit when the first fault is detected in the first functional circuit, and a type of the first functional circuit, and wherein the fourth context tag data is indicative of the type of the second fault, the operational state of the second functional circuit when the second fault is detected in the second functional circuit, and a type of the second functional circuit.

9. The IC of claim 8, further comprising:
a second detection circuit that is coupled to the second functional circuit, and configured to detect the second fault in the second functional circuit and generate a second fault indication that is indicative of the detected second fault; and
a second processing circuit that is coupled to the second detection circuit and the recovery circuit, and configured to:
receive the second fault indication from the second detection circuit;
identify, based on the second fault indication, the second functional domain ID associated with the second fault;
generate, based on the second fault indication, the second context tag data associated with the second fault; and
assign the second priority level to the second fault based on the second functional domain ID and the third context tag data.

10. The IC of claim 8, wherein the recovery circuit is further configured to:
assign a third priority level to the first fault and a fourth priority level to the second fault, wherein the third priority level is assigned based on the third context tag data, the first functional domain ID, and the first priority level, and wherein the fourth priority level is assigned based on the fourth context tag data, the second functional domain ID, and the second priority level;
determine a first recovery operation for the first fault and a second recovery operation for the second fault, wherein the first recovery operation is determined based on the third context tag data and the first functional domain ID, and wherein the second recovery operation is determined based on the fourth context tag data and the second functional domain ID; and
perform, based on the third priority level and the fourth priority level, the first recovery operation and the second recovery operation to recover the first functional circuit and the second functional circuit from the first fault and the second fault, respectively.

11. The IC of claim 10, wherein the third priority level is one of a group consisting of (i) same as the first priority level and (ii) different from the first priority level, and wherein the fourth priority level is one of a group consisting of (i) same as the second priority level and (ii) different from the second priority level.

12. The IC of claim 10, wherein when the third priority level is greater than the fourth priority level, the first recovery operation is performed before the second recovery operation, and wherein when the third priority level is less than the fourth priority level, the second recovery operation is performed before the first recovery operation.

13. The IC of claim 10, further comprising a second storage element configured to store a mapping between a plurality of predefined domain IDs, a second predefined context data set, and a second plurality of policies that is associated with the recovery circuit, wherein the second plurality of policies enables determination of the first recovery operation for the first fault, the second recovery operation for the second fault, a degree of severity of the first fault, and a degree of severity of the second fault at the recovery circuit.

14. The IC of claim 13, wherein the recovery circuit is coupled to the second storage element, and configured to:
    compare the first functional domain ID with each predefined domain ID of the plurality of predefined domain IDs and the third context tag data with each predefined context data of the second predefined context data set; and
    select, from the second plurality of policies, a second set of policies that is associated with the first functional domain ID and the third context tag data, wherein the recovery circuit selects the second set of policies based on the comparison of the first functional domain ID with each predefined domain ID of the plurality of predefined domain IDs and the comparison of the third context tag data with each predefined context data of the second predefined context data set, wherein the second set of policies is indicative of the first recovery operation for the first fault and the degree of severity of the first fault as determined at the recovery circuit, and wherein the recovery circuit assigns the third priority level to the first fault based on the second set of policies and the first priority level.

15. The IC of claim 13, wherein the recovery circuit is coupled to the second storage element, and configured to:
    compare the second functional domain ID with each predefined domain ID of the plurality of predefined domain IDs and the fourth context tag data with each predefined context data of the second predefined context data set; and
    select, from the second plurality of policies, a third set of policies that is associated with the second functional domain ID and the fourth context tag data, wherein the recovery circuit selects the third set of policies based on the comparison of the second functional domain ID with each predefined domain ID of the plurality of predefined domain IDs and the comparison of the fourth context tag data with each predefined context data of the second predefined context data set, wherein the third set of policies is indicative of the second recovery operation for the second fault and the degree of severity of the second fault as determined at the recovery circuit, and wherein the recovery circuit assigns the fourth priority level to the second fault based on the third set of policies and the second priority level.

16. The IC of claim 10, further comprising a diagnostic circuit that is coupled to the first processing circuit and the recovery circuit, and configured to receive the first context tag data and first status data, and facilitate diagnosis of the first fault after the first functional circuit is recovered from the first fault, wherein the recovery circuit is further configured to generate the first status data based on the first recovery operation that is performed to recover the first functional circuit from the first fault.

17. The IC of claim 10, further comprising a diagnostic circuit that is coupled to the recovery circuit, and configured to receive the second context tag data and second status data, and facilitate diagnosis of the second fault after the second functional circuit is recovered from the second fault, wherein the recovery circuit is further configured to generate the second status data based on the second recovery operation that is performed to recover the second functional circuit from the second fault.

18. A fault management method, comprising:
    detecting, by a first detection circuit, a first fault in a first functional circuit;
    generating, by the first detection circuit, a first fault indication that is indicative of the detected first fault;
    receiving, by a first processing circuit, the first fault indication from the first detection circuit;
    identifying, by the first processing circuit based on the first fault indication, a first functional domain identifier (ID) associated with the first fault, wherein the first functional domain ID is indicative of the first functional circuit in which the first fault is detected;
    generating, by the first processing circuit, based on the first fault indication, first context tag data associated with the first fault, wherein the first context tag data is indicative of a type of the first fault and an operational state of the first functional circuit when the first fault is detected in the first functional circuit; and
    assigning, by the first processing circuit, a first priority level to the first fault based on the first context tag data and the first functional domain ID, wherein the first functional circuit is recovered from the first fault based on the first functional domain ID, the first context tag data, and the first priority level.

19. The fault management method of claim 18, further comprising:
    receiving, by a recovery circuit, the first functional domain ID, the first context tag data, and the first priority level from the first processing circuit;
    receiving, by the recovery circuit, a second functional domain ID, second context tag data, and a second priority level associated with a second fault, wherein the second functional domain ID is indicative of a second functional circuit in which the second fault is detected, and the second context tag data is indicative of a type of the second fault and an operational state of the second functional circuit when the second fault is detected in the second functional circuit, and wherein the second priority level is assigned to the second fault based on the second functional domain ID and the second context tag data; and
    generating, by the recovery circuit, third context tag data and fourth context tag data associated with the first fault and the second fault to facilitate recovery of the first functional circuit and the second functional circuit from the first fault and the second fault, respectively, wherein the third context tag data is generated based on the first functional domain ID and the first context tag data, and the fourth context tag data is generated based on the second functional domain ID and the second context tag data, wherein the third context tag data is indicative of the type of the first fault, the operational state of the first functional circuit when the first fault is detected in the first functional circuit, and a type of the first functional circuit, and wherein the fourth context tag data is indicative of the type of the second fault, the operational state of the second functional circuit when the second fault is detected in the second functional circuit, and a type of the second functional circuit.

20. The fault management method of claim 19, further comprising:
    assigning, by the recovery circuit, a third priority level to the first fault and a fourth priority level to the second fault, wherein the third priority level is assigned based on the third context tag data, the first functional domain ID, and the first priority level, and wherein the fourth priority level is assigned based on the fourth context tag data, the second functional domain ID, and the second priority level;

determining, by the recovery circuit, a first recovery operation for the first fault and a second recovery operation for the second fault, wherein the first recovery operation is determined based on the third context tag data and the first functional domain ID, and wherein the second recovery operation is determined based on the fourth context tag data and the second functional domain ID; and performing, by the recovery circuit, based on the third priority level and the fourth priority level, the first recovery operation and the second recovery operation to recover the first functional circuit and the second functional circuit from the first fault and the second fault, respectively.

* * * * *